(12) United States Patent
Wang et al.

(10) Patent No.: US 9,390,277 B2
(45) Date of Patent: Jul. 12, 2016

(54) METHOD AND DEVICE FOR DATA CONFIDENTIALITY PROTECTION BASED ON EMBEDDED UNIVERSAL INTEGRATED CIRCUIT CARD

(71) Applicant: Huawei Device Co., LTD, Shenzhen (CN)

(72) Inventors: Tao Wang, Beijing (CN); Guodong Xue, Shenzhen (CN); Hui Jin, Beijing (CN); Qiang Yi, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/534,609

(22) Filed: Nov. 6, 2014

(65) Prior Publication Data

US 2015/0067351 A1   Mar. 5, 2015

Related U.S. Application Data

(63) Continuation of application No. PCT/CN2013/072034, filed on Mar. 1, 2013.

(30) Foreign Application Priority Data

Oct. 12, 2012   (CN) .......................... 2012 1 0387378

(51) Int. Cl.
*G06F 11/30* (2006.01)
*G06F 12/14* (2006.01)
*G06F 21/62* (2013.01)
*G06F 21/71* (2013.01)
*G06F 21/88* (2013.01)
*H04W 12/12* (2009.01)
*H04L 29/06* (2006.01)
*H04W 4/00* (2009.01)

(52) U.S. Cl.
CPC ................. *G06F 21/62* (2013.01); *G06F 21/71* (2013.01); *G06F 21/88* (2013.01); *H04W 12/12* (2013.01); *H04L 63/107* (2013.01); *H04L 63/1433* (2013.01); *H04W 4/005* (2013.01)

(58) Field of Classification Search
CPC ....................................... G06F 21/62
USPC ....................................... 713/189
See application file for complete search history.

(56) References Cited

U.S. PATENT DOCUMENTS

| | | | |
|---|---|---|---|
| 8,744,406 B2 * | 6/2014 | Ennesser | G06F 21/606 455/410 |
| 2009/0249497 A1 | 10/2009 | Fitzgerald et al. | |
| 2009/0253406 A1 | 10/2009 | Fitzgerald et al. | |
| 2011/0034160 A1 | 2/2011 | Corda et al. | |
| 2011/0092253 A1 * | 4/2011 | Amiel | H04W 8/265 455/558 |
| 2012/0149357 A1 | 6/2012 | Wu et al. | |

FOREIGN PATENT DOCUMENTS

| CN | 101309518 A | 11/2008 |
|---|---|---|
| CN | 101772017 A | 7/2010 |

(Continued)

*Primary Examiner* — Dant Shaifer Harriman
(74) *Attorney, Agent, or Firm* — Slater Matsil, LLP

(57) ABSTRACT

Embodiments of the present invention provide a method and device for data confidentiality protection based on an embedded universal integrated circuit card. An embodiment method includes determining that a terminal device is not held by an authorized user; setting an eUICC in the terminal device to an unavailable state; and instructing the eUICC to perform confidentiality protection processing on data in the eUICC.

14 Claims, 11 Drawing Sheets

An eUICC in a terminal device receives an instruction message, where the instruction message is used for instructing, when the terminal device is not held by an authorized user, the eUICC to perform confidentiality protection processing on data in the eUICC — 301

The eUICC performs confidentiality protection processing on the data in the eUICC according to the instruction message — 302

(56) References Cited

FOREIGN PATENT DOCUMENTS

| CN | 101878492 A | 11/2010 |
| CN | 101996445 A | 3/2011 |
| CN | 102026241 A | 4/2011 |
| CN | 102509033 A | 6/2012 |
| WO | 2012085593 A1 | 6/2012 |

* cited by examiner

METHOD AND DEVICE FOR DATA CONFIDENTIALITY PROTECTION BASED ON EMBEDDED UNIVERSAL INTEGRATED CIRCUIT CARD

This application is a continuation of International Application No. PCT/CN2013/072034, filed on Mar. 1, 2013, which claims priority to Chinese Patent Application No. CN 201210387378.2, filed on Oct. 12, 2012, both of which are hereby incorporated by reference in their entireties.

TECHNICAL FIELD

The present invention relates to the communications technologies and, in particular embodiments, to a method and device for data confidentiality protection based on an embedded universal integrated circuit card (eUICC).

BACKGROUND

A conventional universal integrated circuit card (UICC) is customized by a mobile operator and includes relevant information about the mobile operator upon delivery, and once a UICC is delivered, operator information can no longer be changed. An eUICC is a UICC embedded in a terminal device and allows remote management on the terminal device, for example, to download/delete mobile operator data, and switch a mobile operator network.

For an eUICC, when a terminal device is lost, a user may contact a customer service of a mobile network operator (MNO) or go to a business hall to enable a loss report service. After receiving a request for the loss report service, the mobile operator only needs to update a subscription database in a network to disable subscription of the lost terminal device to reject unauthorized access. However, a security protection mechanism is not provided for subscription information and user data in the eUICC.

SUMMARY

Embodiments of the present invention provide a method and device for data confidentiality protection based on an embedded universal integrated circuit card, so as to perform confidentiality protection on data in an eUICC after a terminal device is lost.

A first aspect provides a method for data confidentiality protection based on an embedded universal integrated circuit card, which includes: determining that a terminal device is not held by an authorized user; setting an eUICC in the terminal device to an unavailable state; and instructing, by using the terminal device, the eUICC to perform confidentiality protection processing on data in the eUICC.

In a first optional implementation manner of the first aspect, the determining that a terminal device is not held by an authorized user includes: receiving geographical location information of the terminal device reported by the terminal device; and determining, when the geographical location information does not belong to a preset authorized use region of the terminal device, that the terminal device is stolen.

With reference to the first possible implementation manner of the first aspect, in a second possible implementation manner of the first aspect, the instructing, by using the terminal device, the eUICC to perform confidentiality protection processing on data in the eUICC includes: sending a first paging message to the terminal device, so that the terminal device sends a subscription stop command to the eUICC, and the eUICC performs confidentiality protection processing on the data in the eUICC according to the subscription stop command, where the first paging message includes identity information of the terminal device and a theft indication that is used for identifying that the terminal device is stolen, and the subscription stop command includes the identity information of the terminal device and the theft indication; or by sending a second paging message to the terminal device, so that the terminal device instructs the eUICC to send a first operational profile OP request message to subscription management unit-securely routing SM-SR and perform, after a first OP response message returned by the SM-SR is received, confidentiality protection processing on the data in the eUICC, where the second paging message includes the identity information of the terminal device, the first OP request message includes the identity information of the terminal device and identity information of the eUICC, the first OP response message is sent by the SM-SR after the SM-SR determines, according to the identity information of the terminal device and the identity information of the eUICC, that the terminal device is stolen, and the first OP response message includes the theft indication.

In a third possible implementation manner of the first aspect, the determining that a terminal device is not held by an authorized user includes: receiving a subscription pause request message sent by a machine to machine communication service provider M2M-SP device, where the subscription pause request message includes identity information of the terminal device, identity information of the eUICC, and a loss indication used for identifying that the terminal device is lost, and the M2M-SP device determines, according to a loss report request of the authorized user, that the terminal device is lost; and determining, according to the loss indication, that the terminal device is lost.

With reference to the third possible implementation manner of the first aspect, in a fourth possible implementation manner of the first aspect, the instructing, by using the terminal device, the eUICC to perform confidentiality protection processing on data in the eUICC includes: receiving an attachment request message sent by the terminal device; and returning an attachment rejection response message to the terminal device, so that the terminal device instructs the eUICC to send a second OP request message to subscription management unit-securely routing SM-SR and perform, after a second OP response message returned by the SM-SR is received, encryption processing on the data in the eUICC, where the second OP request message includes the identity information of the terminal device and the identity information of the eUICC, the second OP response message is sent by the SM-SR after the SM-SR determines, according to the identity information of the terminal device and the identity information of the eUICC, that the terminal device is lost, and the second OP response message includes the loss indication and an encryption key that is used for encrypting the data in the eUICC.

A second aspect provides a method for data confidentiality protection based on an embedded universal integrated circuit card, which includes: receiving, by an eUICC in a terminal device, an instruction message, where the instruction message is used for instructing, when the terminal device is not held by an authorized user, the eUICC to perform confidentiality protection processing on data in the eUICC; and performing, by the eUICC, confidentiality protection processing on the data in the eUICC according to the instruction message.

In a first possible implementation manner of the second aspect, the instruction message is a subscription stop command; and the receiving, by an eUICC in a terminal device, an instruction message includes: receiving, by the eUICC, the subscription stop command sent by the terminal device, where the subscription stop command is generated by the terminal device and sent by the terminal device to the eUICC after the terminal device receives a first paging message sent by a mobile network operator MNO device, the first paging message is sent by the MNO device to the terminal device after the MNO device determines, according to geographical location information reported by the terminal device, that the terminal device is stolen, the first paging message includes identity information of the terminal device and a theft indication that is used for identifying that the terminal device is stolen, and the subscription stop command includes the identity information of the terminal device and the theft indication; and sending, by the eUICC, a subscription stop response to subscription management unit-securely routing SM-SR by using the terminal device, where the subscription stop response includes the identity information of the terminal device, identity information of the eUICC, and the theft indication.

In a second possible implementation manner of the second aspect, the instruction message is a first operational profile OP response message; and the receiving, by an eUICC in a terminal device, an instruction message includes: sending, by the eUICC, a first OP request message to subscription management unit-securely routing SM-SR by using the terminal device according to an instruction after the terminal device receives a second paging message, where the second paging message is sent by a mobile network operator MNO device to the terminal device after the MNO device determines, according to geographical location information reported by the terminal device, that the terminal device is stolen, the second paging message includes identity information of the terminal device, and the first OP request message includes the identity information of the terminal device and identity information of the eUICC; and receiving, by the eUICC by using the terminal device, a first OP response message returned by the SM-SR, where the first OP response message is sent by the SM-SR after the SM-SR determines, according to the identity information of the terminal device and the identity information of the eUICC, that the terminal device is stolen, and the first OP response message includes a theft indication used for identifying that the terminal device is stolen.

In a third possible implementation manner of the second aspect, the instruction message is a second operational profile OP response message; and the receiving, by an eUICC in a terminal device, an instruction message includes: sending, by the eUICC, a second OP request message to subscription management unit-securely routing SM-SR by using the terminal device according to an instruction after the terminal device receives an attachment rejection response message, where the attachment rejection response message is sent by a mobile network operator MNO device to the terminal device after the MNO device receives an attachment request message sent by the terminal device and determines that the terminal device is lost, and the second OP request message includes identity information of the terminal device and identity information of the eUICC; and receiving, by the eUICC by using the terminal device, a second OP response message returned by the SM-SR, where the second OP response message is sent by the SM-SR after the SM-SR determines, according to the identity information of the terminal device and the identity information of the eUICC, that the terminal device is lost, and the second OP response message includes a loss indication used for identifying that the terminal device is lost and an encryption key used for encrypting the data in the eUICC.

A third aspect provides a method for data confidentiality protection based on an embedded universal integrated circuit card, which includes: determining that a terminal device is not held by an authorized user; receiving a first OP request message sent by using the terminal device by an eUICC in the terminal device, where the first OP request message is sent by the eUICC as instructed by the terminal device after the terminal device receives an attachment rejection response message sent by a mobile network operator MNO device, and the first OP request message includes identity information of the terminal device and identity information of the eUICC; and returning a first OP response message to the eUICC by using the terminal device, so that the eUICC performs confidentiality protection processing on data in the eUICC.

In a first possible implementation manner of the third aspect, the determining that a terminal device is not held by an authorized user includes: receiving a subscription stop request message sent by the MNO device, where the subscription stop request message is sent by the MNO device after the MNO device determines that the terminal device is stolen and the terminal device is in a detached state, and the subscription stop request message includes the identity information of the eUICC and the theft indication; and determining, according to the identity information of the eUICC and the theft indication, that the terminal device is stolen.

With reference to the first possible implementation manner of the third aspect, in a second possible implementation manner of the third aspect, the first OP response message includes the theft indication used for identifying that the terminal device is stolen; and the returning a first OP response message to the eUICC by using the terminal device, so that the eUICC performs confidentiality protection processing on data in the eUICC includes: returning the first OP response message to the eUICC by using the terminal device, so that the eUICC deletes the data in the eUICC.

In a third possible implementation manner of the third aspect, the determining that a terminal device is not held by an authorized user includes: receiving a subscription pause request message sent by a machine to machine communication service provider M2M-SP device, and forwarding the subscription pause request message to the MNO device, so that the MNO device determines that the terminal device is lost, where the subscription pause request message includes the identity information of the terminal device, the identity information of the eUICC, and a loss indication; and determining, according to the loss indication, that the terminal device is lost.

With reference to the third possible implementation manner of the third aspect, in a fourth possible implementation manner of the third aspect, the first OP response message includes the loss indication used for identifying that the terminal device is lost and an encryption key used for encrypting the data in the eUICC; and the returning a first OP response message to the eUICC by using the terminal device, so that the eUICC performs confidentiality protection processing on data in the eUICC includes: returning the first OP response message to the eUICC by using the terminal device, so that the eUICC performs encryption processing on the data in the eUICC.

A fourth aspect provides a mobile network operator MNO device. A determining module is configured to determine that a terminal device is not held by an authorized user. A sending module is configured to set an embedded universal integrated circuit card eUICC in the terminal device to an unavailable state. A confidentiality protection processing instruction module is configured to instruct, by using the terminal device, the eUICC to perform confidentiality protection processing on data in the eUICC.

In a first possible implementation manner of the fourth aspect, the determining module includes: a first receiving submodule, configured to receive geographical location information of the terminal device reported by the terminal device; and a first determining submodule, configured to: when the geographical location information received by the first receiving submodule does not belong to a preset authorized use region of the terminal device, determine that the terminal device is stolen.

With reference to the first possible implementation manner of the fourth aspect, in a second possible implementation manner of the fourth aspect, the confidentiality protection processing instruction module is specifically configured to send a first paging message to the terminal device, so that the terminal device sends a subscription stop command to the eUICC, and the eUICC performs confidentiality protection processing on the data in the eUICC according to the subscription stop command, where the first paging message includes the identity information of the terminal device and a theft indication that is used for identifying that the terminal device is stolen, and the subscription stop command includes the identity information of the terminal device and the theft indication; or the confidentiality protection processing instruction module is specifically configured to send a second paging message to the terminal device, so that the terminal device instructs the eUICC to send a first operational profile OP request message to subscription management unit-securely routing SM-SR and perform, after a first OP response message returned by the SM-SR is received, confidentiality protection processing on the data in the eUICC, where the second paging message includes the identity information of the terminal device, the first OP request message includes the identity information of the terminal device and the identity information of the eUICC, the first OP response message is sent by the SM-SR after the SM-SR determines, according to the identity information of the terminal device and the identity information of the eUICC, that the terminal device is stolen, and the first OP response message includes the theft indication.

In a third possible implementation manner of the fourth aspect, the determining module includes: a second receiving submodule, configured to receive a subscription pause request message sent by a machine to machine communication service provider M2M-SP device, where the subscription pause request message includes identity information of the terminal device, identity information of the eUICC, and a loss indication used for identifying that the terminal device is lost, and the M2M-SP device determines, according to a loss report request of the authorized user, that the terminal device is lost; and a second determining submodule, configured to determine, according to the loss indication, that the terminal device is lost.

With reference to the third possible implementation manner of the fourth aspect, in a fourth possible implementation manner of the fourth aspect, the confidentiality protection processing instruction module includes: a third receiving submodule, configured to receive an attachment request message sent by the terminal device; and a sending submodule, configured to return an attachment rejection response message to the terminal device, so that the terminal device instructs the eUICC to send a second OP request message to subscription management unit-securely routing SM-SR and perform, after a second OP response message returned by the SM-SR is received, encryption processing on the data in the eUICC, where the second OP request message includes the identity information of the terminal device and the identity information of the eUICC, the second OP response message is sent by the SM-SR after the SM-SR determines, according to the identity information of the terminal device and the identity information of the eUICC, that the terminal device is lost, and the second OP response message includes the loss indication and an encryption key that is used for encrypting the data in the eUICC.

A fifth aspect provides an embedded universal integrated circuit card eUICC device, embedded in a terminal device, where the eUICC device includes: an instruction receiving module, configured to receive an instruction message, where the instruction message is used for instructing, when the terminal device is not held by an authorized user, the eUICC device to perform confidentiality protection processing on data in the eUICC device; and a confidentiality protection processing module, configured to perform confidentiality protection processing on the data in the eUICC device according to the instruction message.

In a first possible implementation manner of the fifth aspect, the instruction message is a subscription stop command; and the instruction receiving module includes: a first receiving submodule, configured to receive the subscription stop command sent by the terminal device, where the subscription stop command is generated by the terminal device and sent by the terminal device to the eUICC device after the terminal device receives a first paging message sent by a mobile network operator MNO device, the first paging message is sent by the MNO device to the terminal device after the MNO device determines, according to geographical location information reported by the terminal device, that the terminal device is stolen, the first paging message includes identity information of the terminal device and a theft indication that is used for identifying that the terminal device is stolen, and the subscription stop command includes the identity information of the terminal device and the theft indication; and a first sending submodule, configured to send a subscription stop response to subscription management unit-securely routing SM-SR by using the terminal device, where the subscription stop response includes the identity information of the terminal device, identity information of the eUICC device, and the theft indication.

In a second possible implementation manner of the fifth aspect, the instruction message is a first operational profile OP response message; and the instruction receiving module includes: a second sending submodule, configured to send a first OP request message to subscription management unit-securely routing SM-SR by using the terminal device according to an instruction after the terminal device receives a second paging message, where the second paging message is sent by a mobile network operator MNO device to the terminal device after the MNO device determines, according to geographical location information reported by the terminal device, that the terminal device is stolen, the second paging message includes identity information of the terminal device, and the first OP request message includes the identity information of the terminal device and identity information of the eUICC device; and a second receiving submodule, configured to receive, by using the terminal device, a first OP response message returned by the SM-SR, where the first OP response message is sent by the SM-SR after the SM-SR determines, according to the identity information of the terminal device and the identity information of the eUICC, that the terminal device is stolen, and the first OP response message includes a theft indication used for identifying that the terminal device is stolen.

In a third possible implementation manner of the fifth aspect, the instruction message is a second operational profile OP response message; and the instruction receiving module includes: a third sending submodule, configured to send a second OP request message to subscription management unit-securely routing SM-SR by using the terminal device according to an instruction after the terminal device receives an attachment rejection response message, where the attachment rejection response message is sent by a mobile network operator MNO device to the terminal device after the MNO device receives an attachment request message sent by the terminal device and determines that the terminal device is lost, and the second OP request message includes identity information of the terminal device and identity information of the eUICC device; and a third receiving submodule, configured to receive, by using the terminal device, a second OP response message returned by the SM-SR, where the second OP response message is sent by the SM-SR after the SM-SR determines, according to the identity information of the terminal device and the identity information of the eUICC device, that the terminal device is lost, and the second OP response message includes a loss indication used for identifying that the terminal device is lost and an encryption key used for encrypting the data in the eUICC device.

A sixth aspect provides a subscription management unit-securely routing SM-SR device, which includes: a determining module, configured to determine that a terminal device is not held by an authorized user; a first request receiving module, configured to receive a first OP request message sent by using the terminal device by an eUICC in the terminal device, where the first OP request message is sent by the eUICC as instructed by the terminal device after the terminal device receives an attachment rejection response message sent by a mobile network operator MNO device, and the first OP request message includes identity information of the terminal device and identity information of the eUICC; and a first response sending module, configured to return a first OP response message to the eUICC by using the terminal device, so that the eUICC performs confidentiality protection processing on data in the eUICC.

In a first possible implementation manner of the sixth aspect, the determining module includes: a receiving submodule, configured to receive a subscription stop request message sent by the MNO device, where the subscription stop request message is sent by the MNO device after the MNO device determines that the terminal device is stolen and the terminal device is in a detached state, and the subscription stop request message includes the identity information of the eUICC and the theft indication; and a first determining submodule, configured to determine, according to the identity information of the eUICC and the theft indication, that the terminal device is stolen.

With reference to the first possible implementation manner of the sixth aspect, in a second possible implementation manner of the sixth aspect, the first OP response message includes the theft indication used for identifying that the terminal device is stolen; and the first response sending module is specifically configured to return the first OP response message to the eUICC by using the terminal device, so that the eUICC deletes the data in the eUICC.

In a third possible implementation manner of the sixth aspect, the determining module includes: a receiving and forwarding submodule, configured to receive a subscription pause request message sent by a machine to machine communication service provider M2M-SP device, and forward the subscription pause request message to the MNO device, so that the MNO device determines that the terminal device is lost, where the subscription pause request message includes the identity information of the terminal device, the identity information of the eUICC, and a loss indication; and a second determining submodule, configured to determine, according to the loss indication, that the terminal device is lost.

With reference to the third possible implementation manner of the sixth aspect, in a fourth possible implementation manner of the sixth aspect, the first OP response message includes the loss indication used for identifying that the terminal device is lost and an encryption key used for encrypting the data in the eUICC; and the first response sending module is specifically configured to return the first OP response message to the eUICC by using the terminal device, so that the eUICC performs encryption processing on the data in the eUICC.

A seventh aspect provides a system for data confidentiality protection based on an embedded universal integrated circuit card eUICC, which includes: any mobile network operator MNO device provided in the fourth aspect of the present invention, any embedded universal integrated circuit card eUICC device provided in the fifth aspect of the present invention, and any subscription management unit-securely routing SM-SR device provided in the sixth aspect of the present invention.

According to the method and device for data confidentiality protection based on an embedded universal integrated circuit card provided in the embodiments of the present invention, after determining that a terminal device is not held by an authorized user, an MNO device sets an eUICC in the terminal device to an unavailable state, and instructs, by using the terminal device, the eUICC to perform confidentiality protection processing on data in the eUICC, so as to implement protection on the data in the eUICC in a case in which the terminal device is stolen or lost.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
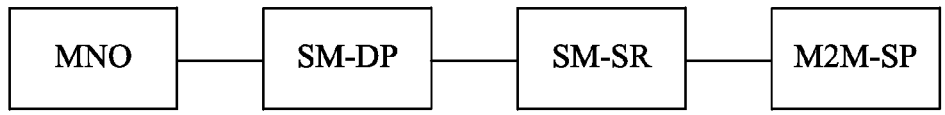
FIG. 1 is a schematic diagram of a system architecture for an eUICC according to an embodiment of the present invention.

FIG. 1 is a schematic diagram of a system architecture for an eUICC according to an embodiment of the present invention. As shown in FIG. 1, the system architecture includes: an MNO device, a subscription management unit (Subscription Manager, briefly referred to as SM), and a machine to machine communication service provider (Machine to Machine-Service Provider, briefly referred to as M2M-SP) device, where the SM includes subscription management unit-securely routing (Subscription Manager-Securely Routing, briefly referred to as SM-SR) and subscription management unit-data preparation (Subscription Manager-Data Preparation, briefly referred to as SM-DP).

The MNO device is mainly responsible for ensuring that a subscriber accesses a mobile communications network normally, and providing a corresponding speech or data communication service for a user.

The SM-SR is mainly configured to directly manage data such as a subscription related operational profile (Operational Profile, briefly referred to as OP) or provisioning profile (Provisioning Profile, briefly referred to as PP), for example, is responsible for downloading, deleting, and changing the data.

The SM-DP is mainly configured to prepare data such as a subscription related OP/PP, for example, a profile (Profile) encryption manner is used to ensure that the OP/PP is securely downloaded to an eUICC.

The M2M-SP device is mainly responsible for using a communications network provided by the MNO device, and provides an M2M service, such as a meter reading service for a water meter or an electricity meter or a gas meter, or remote monitoring in a building automation system, for the subscriber.

To implement protection on data in an eUICC in a terminal device in a case in which the terminal device is not held by an authorized user, for example, the terminal device is lost or stolen, a solution is provided in the following embodiments of the present invention. The following embodiments of the present invention may be implemented based on the system architecture shown in FIG. 1.

Figure 2:
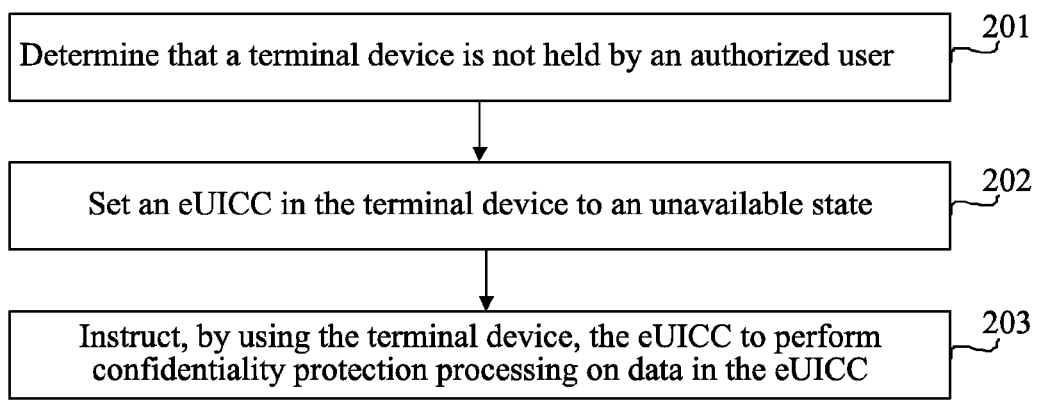
FIG. 2 is a flowchart of a method for data confidentiality protection based on an eUICC according to an embodiment of the present invention.

FIG. 2 is a flowchart of a method for data confidentiality protection based on an eUICC according to an embodiment of the present invention. As shown in FIG. 2, the method in this embodiment includes the following steps.

Step 201. Determine that a terminal device is not held by an authorized user.

Step 202. Set an eUICC in the terminal device to an unavailable state.

Step 203. Instruct, by using the terminal device, the eUICC to perform confidentiality protection processing on data in the eUICC.

This embodiment is executed by an MNO device. Specifically, the MNO device determines whether the terminal device is held by an authorized user, when determining that the terminal device is not held by the authorized user, first sets the eUICC in the terminal device to an unavailable state, so as to forbid subsequent unauthorized access of the terminal device to a network of the MNO device, and instructs, by using the terminal device, the eUICC to perform confidentiality protection processing on the data in the eUICC, that is, attempts to guide, by using the terminal device, the eUICC to protect local data.

For machine devices such as an MNO device, SM-SR, SM-DP, and an M2M-SP, a scenario in which a terminal device is not held by an authorized user includes cases in which the terminal device is stolen or the terminal device is lost or the like. According to different scenarios, the MNO device determines, in different specific implementation manners, that a terminal device is not held by an authorized user.

For example, if a terminal device is stolen and is therefore not held by an authorized user, a process of determining, by the MNO device, that a terminal device is not held by an authorized user includes: receiving geographical location information of the terminal device reported by the terminal device, and when the geographical location information does not belong to a preset authorized use region of the terminal device, considering, by the MNO device, a case in which the terminal device is stolen, so as to determine that the terminal device is stolen, that is, determine that the terminal device is not held by the authorized user. Because many terminal devices have a low mobility characteristic, a user may customize in subscription an authorized use region of a terminal device in advance, and store the authorized use region in the MNO device.

The terminal device periodically reports geographical location information of the terminal device to the MNO device by using signaling. The MNO device may compare the geographical location information reported by the terminal device and the authorized use region of the terminal device in subscription data of the user, and determine whether the geographical location information reported by the terminal device belongs to the authorized use region, so as to conclude through analysis whether the terminal device is stolen. If the geographical location information reported by the terminal device does not belong to the authorized use region of the terminal device, the MNO device may determine that the terminal device is stolen, and otherwise, determine that the terminal device is not stolen (that is, is still held by the authorized user).

It is noted here that, when a geographical location of a terminal device with low mobility changes, it is very likely that the terminal device is stolen; however, the cause may also be system maintenance (for example, universal maintenance of all terminal devices at a location) organized by the M2M-SP device. In these special cases, an incorrect operation may occur if the MNO device directly determines that the terminal device is stolen, which affects a service of the terminal device, and based on this, the MNO device may acquire, from the M2M-SP device, a processing indication of whether the terminal device is stolen. Therefore, an optional implementation process of determining, by the MNO device when the geographical location information reported by the terminal device does not belong to the preset authorized use region of the terminal device, that the terminal device is stolen includes: after determining that the geographical location information reported by the terminal device does not belong to the preset authorized use region of the terminal device, sending, by the MNO device, a device theft processing policy request message to the M2M-SP device, where the device theft processing policy request message includes identity information of the terminal device, identity information of the eUICC, and the geographical location information reported by the terminal device; receiving a device theft processing policy response message sent by the M2M-SP device, where the device theft processing policy response message is sent by the M2M-SP device after the M2M-SP device determines, according to the identity information of the terminal device, the identity information of the eUICC, and the geographical location information, that the terminal device is stolen, and the device theft processing policy response message includes a theft processing indication; and determining, according to the theft processing indication, that the terminal device is stolen.

Optionally, a process of setting, by the MNO device, the eUICC in the terminal device to an unavailable state in the case in which the terminal device is stolen includes: adding the identity information of the eUICC to a blacklist), so as to keep the eUICC in an unavailable state. Optionally, the MNO device may further suspend an OP corresponding to the eUICC, so as to keep the eUICC in an unavailable state.

Optionally, in the case in which the terminal device is stolen, because the MNO device determines, based on latest geographical location information reported by the terminal device, that the terminal device is stolen, the terminal device may still be in an attached state, or may also be in an unattached state (that is, a detached state). In this embodiment, in the case in which the terminal device is stolen, the MNO device instructs, by using the terminal device in different manners according to whether the terminal device is in an attached state, the eUICC to perform confidentiality protection processing on the data in the eUICC.

For a case in which the terminal device is stolen and the terminal device is in an attached state: an optional implementation manner of step 203 includes: sending a first paging message to the terminal device, so that the terminal device sends a subscription stop command to the eUICC, and the eUICC performs confidentiality protection processing on the data in the eUICC according to the subscription stop command. The first paging message sent by the MNO device to the terminal device includes the identity information of the terminal device and a theft indication (theft indication) that is used for identifying that the terminal device is stolen, and the subscription stop command sent by the terminal device to the eUICC includes the identity information of the terminal device and the theft indication. After receiving the subscription stop command, the eUICC may learn, according to the theft indication in the subscription stop command, that the terminal device is stolen and confidentiality protection processing needs to be performed on the data in the eUICC.

For the case in which the terminal device is stolen and the terminal device is in an attached state: an optional implementation manner of step 203 includes: sending a second paging message to the terminal device, so that the terminal device instructs the eUICC to send a first OP request message to the SM-SR and perform, after a first OP response message returned by the SM-SR is received, confidentiality protection processing on the data in the eUICC. The second paging message includes the identity information of the terminal device, the first OP request message includes the identity information of the terminal device and the identity information of the eUICC, the first OP response message is sent by the SM-SR after the SM-SR determines, according to the identity information of the terminal device and the identity information of the eUICC, that the terminal device is stolen, and the first OP response message includes the theft indication used for identifying that the terminal device is stolen. In the implementation manner, the MNO device pages the terminal device by using the second paging message, and the terminal device sends an instruction message to the eUICC after receiving the second paging message of the MNO device, so that the eUICC initiates an OP request to the SM-SR, and further the SM-SR determines that the terminal device is stolen and carries the theft indication to an OP response sent to the eUICC. After receiving the first OP response message, the eUICC may learn, according to the theft indication in the first OP response message, that the terminal device is stolen and confidentiality protection processing needs to be performed on the data in the eUICC.

In the implementation manner, after receiving the first OP response message, the SM-SR may send a subscription data deletion request message to the SM-DP, so as to instruct the SM-DP to delete the subscription data corresponding to the eUICC.

Based on the foregoing, in an optional implementation manner, before step 203, includes: determining whether the terminal device is in an attached state; if it is determined that the terminal device is in an attached state, executing step 203, that is, instructing, by using the terminal device, the eUICC to perform confidentiality protection processing on the data in the eUICC. Optionally, the MNO device may search the subscription data corresponding to the terminal device for the state information, so as to determine whether the terminal device is in an attached state.

Optionally, if it is determined that the terminal device is in a detached state, the MNO device sends a subscription stop request message to the SM-SR, so that the SM-SR instructs the SM-DP to delete subscription data corresponding to the eUICC, where the subscription stop request message includes identity information of the eUICC and a theft indication that is used for identifying that the terminal device is stolen. Specifically, in a case in which the terminal device is detached, the MNO device sends the subscription stop request message to the SM-SR, where the subscription stop request message carries the identity information of the eUICC and the theft indication; after receiving the subscription stop request message sent by the MNO device, the SM-SR learns, according to the theft indication in the subscription stop request message, that the terminal device is stolen, and therefore initiates a subscription data deletion request to the SM-DP, where the request carries the identity information of the eUICC; the SM-DP deletes the subscription data corresponding to the eUICC according to the identity information of the eUICC. Optionally, after deleting the subscription data corresponding to the eUICC, the SM-DP may further return a subscription data deletion completion message to the SM-SR.

Further, in a case in which it is determined that the terminal device is in a detached state, when the terminal device sends an attachment request message to the MNO device, the MNO device returns an attachment rejection response message to the terminal device, so as to forbid unauthorized access of the terminal device to a network of the MNO device. In this case, after receiving the attachment rejection response message, the terminal device instructs the eUICC to send an OP request message to the SM-SR and perform, after receiving an OP response message returned by the SM-SR, confidentiality protection processing on the data in the eUICC. The OP request message here includes identity information of the terminal device and identity information of the eUICC, the OP response message here is sent by the SM-SR after the SM-SR determines, according to the identity information of the terminal device and the identity information of the eUICC, that the terminal device is lost, and the OP response message here includes the foregoing theft indication, so as to instruct the eUICC to perform confidentiality protection processing on the data in the eUICC.

In the case in which the terminal device is stolen, an optional implementation manner in which the MNO device instructs, by using the terminal device, the eUICC to perform confidentiality protection processing on the data in the eUICC is: instructing, by using the terminal device, the eUICC to delete the data in the eUICC. It is noted here that, in addition to that the MNO device instructs the eUICC to delete the data in the eUICC, the MNO device may further instruct the terminal device to delete the data in the terminal device.

In the case in which the terminal device is stolen, another optional implementation manner in which the MNO device instructs, by using the terminal device, the eUICC to perform confidentiality protection processing on the data in the eUICC is: instructing, by using the terminal device, the eUICC to encrypt the data in the eUICC, where an encryption key used by the eUICC to encrypt the data may be predetermined, or may also be provided by the MNO device or another network element for the eUICC.

It is noted here that, in the embodiments of the present invention, the data in the eUICC includes, but is not limited to: an OP, a PP, and user data. In the implementations of the present invention, the identity information of the terminal device may include, but is not limited to, an International Mobile Equipment Identity (International Mobile Equipment Identity, briefly referred to as IMEI) and an International Mobile Subscriber Identity (International Mobile Subscriber Identity, briefly referred to as IMSI). In different messages, the carried identity information of the terminal device is either an IMEI or an IMSI. For example, the identity information of the terminal device carried in various paging messages may be an IMSI, and the identity information of the terminal device carried in messages other than paging messages may be an IMEI. In the embodiments of the present invention, the identity information of the eUICC may be, but is not limited to, an embedded identity (embedded IDentity, briefly referred to as eID).

For another example, if a terminal device is stolen and is therefore not held by an authorized user, the process of determining, by the MNO device, that a terminal device is not held by an authorized user includes: receiving, by the MNO device, a subscription pause request message sent by an M2M-SP device, where the subscription pause request message includes the identity information of the terminal device, the identity information of the eUICC, and a loss indication used for identifying that the terminal device is lost, and the M2M-SP device determines, according to a loss report request of the authorized user, that the terminal device is lost; determining, by the MNO device according to the loss indication, that the terminal device is lost. Specifically, after the authorized user of the terminal device discovers that the terminal device is lost, and initiate the loss report request to the M2M-SP device; after the M2M-SP device receives the loss report request, the M2M-SP device considers that the terminal device being not held by the authorized user belongs to a case in which the terminal device is lost, so as to determine that the terminal device is lost, and then the M2M-SP device initiates a subscription pause request message to the MNO device by using the SM-SR, and carries the identity information of the terminal device, the identity information of the eUICC, and the loss indication (Loss indication); and after the MNO device receives the subscription pause request message, the MNO device determines, according to the loss indication in the subscription pause request message, that the terminal device is lost.

Optionally, in the case in which the terminal device is lost, the process of setting, by the MNO device, an eUICC in the terminal device to an unavailable state includes: suspending an OP corresponding to the eUICC, so as to keep the eUICC in an unavailable state; and returning a subscription pause response message to the M2M-SP device by using the SM-SR, where the subscription pause response message includes the identity information of the terminal device and the identity information of the eUICC. After receiving the subscription pause response message, the M2M-SP device may back up charging information relevant to the terminal device and pause charging.

Before the authorized user cancels a loss report, the terminal device may attempt to access the network of the MNO device, and may be rejected. Based on this, in the case in which the terminal device is lost, an optional implementation manner of step 203 includes: receiving the attachment request message sent by the terminal device; and returning the attachment rejection response message to the terminal device, so that the terminal device instructs the eUICC to send a second OP request message to the SM-SR and perform, after a second OP response message returned by the SM-SR is received, encryption processing on the data in the eUICC. The second OP request message includes the identity information of the terminal device and the identity information of the eUICC, the second OP response message is sent by the SM-SR after the SM-SR determines, according to the identity information of the terminal device and the identity information of the eUICC, that the terminal device is lost, and the second OP response message includes the loss indication and an encryption key used for encrypting the data in the eUICC. Specifically, after an access of the terminal device to the network of the MNO device is rejected, the terminal device sends an instruction message to the eUICC, so that the eUICC automatically activates a PP to initiate an OP request to the SM-SR by using the terminal device, where the OP request carries the identity information of the terminal device and the identity information of the eUICC; the SM-SR may determine, according to the identity information of the terminal device and the identity information of the eUICC, that the terminal device is lost, and add the encryption key and the loss indication to an OP response sent to the eUICC. After receiving a second OP response message, the eUICC may learn, according to the loss indication in the second OP response message, that the terminal device is lost and encryption processing needs to be performed on the data in the eUICC, and encrypt the data in the eUICC by using the encryption key in the second OP response message. Optionally, after finishing encryption processing on the data in the eUICC, the eUICC may return a data encryption confirmation message to the SM-SR by using the terminal device.

It is noted here that in the foregoing process, because both the subscription pause request message sent by the M2M-SP device to the MNO device and the subscription pause response message returned by the MNO device to the M2M-SP device need to be forwarded by using the SM-SR, and in the process, the SM-SR may learn relevant information about the lost terminal device. Based on this, the SM-SR may determine, according to the identity information of the terminal device and the identity information of the eUICC, whether the device is lost.

It is noted here that the loss report of the authorized user has a maximum time limit, and within the time limit, the authorized user may cancel the loss report to continue normal use of the eUICC and the terminal device. Based on this, in the case in which the terminal device is lost, the method in this embodiment further includes: receiving, by the MNO device, a subscription restoration request message sent by using the SM-SR by the M2M-SP device, where the subscription restoration request message includes the identity information of the terminal device, the identity information of the eUICC, and a restoration indication used for identifying that the terminal device is held by the authorized user again; canceling the loss report for the OP corresponding to the eUICC, so that the eUICC is restored to an available state; and sending a subscription restoration response message to the M2M-SP device by using the SM-SR, where the subscription restoration response message includes the identity information of the terminal device and the identity information of the eUICC. Specifically, when needing to cancel the loss report, the authorized user may send a loss report cancelation request to the M2M-SP device, and correspondingly, the M2M-SP device receives the loss report cancelation request, learns, according to the loss report cancelation request, that the terminal device is held by the authorized user again, and sends a subscription restoration request message to the MNO device by using the SM-SR, where the subscription restoration request message carries the identity information of the terminal device, the identity information of the eUICC, and the restoration indication; after receiving the subscription restoration request message, the MNO device restores the eUICC to an available state, and returns a subscription restoration response message to the M2M-SP device by using the SM-SR. In addition, the M2M-SP device reloads a backup of the charging information and continues charging the terminal device. Next, the terminal device may be guided by the eUICC to access the network of the MNO device again. Specifically, the eUICC resends a third OP request message to the SM-SR, where the third OP request message carries the identity information of the terminal device and the identity information of the eUICC; the SM-SR determines, according to the identity information of the terminal device and the identity information of the eUICC, that the loss report of the terminal device is canceled, and adds a decryption key and the restoration indication to an OP response sent to the eUICC; and the eUICC learns, according to the restoration indication, that the loss report of the terminal device is canceled, and performs decryption processing, by using the decryption key, on the data encrypted before in the eUICC. Optionally, after successfully decrypting the data, the eUICC may return a data decryption confirmation message to the SM-SR by using the terminal device.

Optionally, when the maximum time limit is reached but the authorized user still does not cancel the loss report, the subscription data paused before is no longer kept on a network side, and in this case, the subscription data on the network side may be deleted after settlement for the authorized user is completed. Specifically, after the time of the loss report for the terminal device by the authorized user reaches the maximum time limit, before deleting the backup of the charging information, the M2M-SP device instructs the user to finish settlement, and then instructs network side devices such as the SM-DP and the MNO device\SM-SR to delete the subscription data corresponding to the terminal device.

As can be seen from the above, according to the method for data confidentiality protection based on an eUICC provided in this embodiment, after determining that a terminal device is not held by an authorized user, an MNO device sets an eUICC in the terminal device to an unavailable state, so as to forbid unauthorized access of the terminal device to a network of the MNO device, and instructs, by using the terminal device, the eUICC to perform confidentiality protection processing on data in the eUICC, so as to implement protection on the data in the eUICC in a case in which the terminal device is stolen or lost, thereby better protecting security of personal information of a user.

Figure 3:
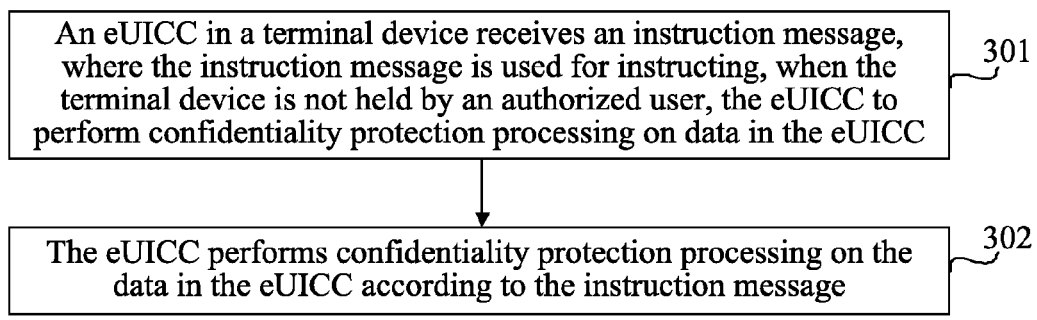
FIG. 3 is a flowchart of a method for data confidentiality protection based on an eUICC according to another embodiment of the present invention.

FIG. 3 is a flowchart of a method for data confidentiality protection based on an eUICC according to another embodiment of the present invention. As shown in FIG. 3, the method in this embodiment includes:

Step 301. An eUICC in a terminal device receives an instruction message, where the instruction message is used for instructing, when the terminal device is not held by an authorized user, the eUICC to perform confidentiality protection processing on data in the eUICC.

Step 302. The eUICC performs confidentiality protection processing on the data in the eUICC according to the instruction message.

This embodiment is executed by the eUICC in the terminal device. Specifically, when the terminal device is not held by an authorized user, a network side device of the MNO device guides the eUICC in the terminal device to perform confidentiality protection processing on the data, so that the eUICC receives the instruction information used for instructing the eUICC to perform confidentiality protection processing on the data, and next the eUICC performs confidentiality protection processing on the data in the eUICC according to the instruction information.

According to different network side devices which determine that the terminal device is not held by an authorized user, the eUICC also receives the instruction information in different manners. The network side device here may be an MNO device, SM-SR, or the like. A scenario in which the terminal device is not held by an authorized user includes cases in which the terminal device is stolen or the terminal device is lost or the like. According to different scenarios, that the terminal device is not held by the authorized user is determined in different manners, and therefore, the eUICC also receives the instruction information in different manners. The following makes description by using an example:

In an optional implementation manner, it is assumed that the terminal device is stolen and is therefore not held by an authorized user; therefore, before step 301, the terminal device periodically sends geographical location information of the terminal device to the MNO device, so that the MNO device determines, according to the geographical location information, that the terminal device is stolen. Specifically, because many terminal devices have a low mobility characteristic, a user may customize in subscription an authorized use region of a terminal device in advance, and store the authorized use region in the MNO device. The terminal device periodically reports geographical location information of the terminal device to the MNO device by using signaling. The MNO device may compare the geographical location information reported by the terminal device and the authorized use region of the terminal device in subscription data of the user, and determine whether the geographical location information reported by the terminal device belongs to the authorized use region, so as to conclude through analysis whether the terminal device is stolen. In this embodiment, the MNO device determines, before step 301, that the terminal device is stolen.

For a case in which the terminal device is stolen, an implementation manner of the instruction message is a subscription stop command. Correspondingly, a process of receiving, by the eUICC in the terminal device, the instruction message includes: receiving, by the eeUICC, a subscription stop command sent by the terminal device, where the subscription stop command is generated by the terminal device and sent by the terminal device to the eUICC after the terminal device receives a first paging message sent by the MNO device, the first paging message is sent by the MNO device to the terminal device after the MNO device determines, according to the geographical location information reported by the terminal device, that the terminal device is stolen, the first paging message includes the identity information of the terminal device and a theft indication that is used for identifying that the terminal device is stolen, and the subscription stop command includes the identity information of the terminal device and the theft indication; and sending, by the eUICC, a subscription stop response to the SM-SR by using the terminal device, where the subscription stop response includes the identity information of the terminal device, the identity information of the eUICC, and the theft indication. After receiving the subscription stop response, the SM-SR sends a subscription data deletion request message to SM-DP, so as to instruct the SM-DP to delete subscription data corresponding to the eUICC.

Specifically, after determining, according to geographical location information most recently reported by the terminal device, that the terminal device is stolen, the MNO device sends the first paging message to the terminal device, where the first paging message carries the identity information of the terminal device and the theft indication; after receiving the first paging message, the terminal device sends the subscription stop command to the eUICC, where the subscription stop command carries the identity information of the terminal device and the theft indication. After receiving the subscription stop command, the eUICC learns, according to the theft indication in the subscription stop command, that the terminal device is stolen and confidentiality protection processing needs to be performed for the terminal device.

For the case in which the terminal device is stolen: an implementation manner of the instruction message is a first OP response message. Correspondingly, the process of receiving, by the eUICC in the terminal device, the instruction message includes: sending, by the eUICC, a first OP request message to the SM-SR by using the terminal device according to an instruction after the terminal device receives the second paging message, where the second paging message is sent by the MNO device to the terminal device after the MNO device determines, according to the geographical location information reported by the terminal device, that the terminal device is stolen, the second paging message includes the identity information of the terminal device, and the first OP request message includes the identity information of the terminal device and the identity information of the eUICC; and receiving, by the eUICC by using the terminal device, the first OP response message returned by the SM-SR, where the first OP response message is sent by the SM-SR after the SM-SR determines, according to the identity information of the terminal device and the identity information of the eUICC, that the terminal device is stolen, and the first OP response message includes the theft indication used for identifying that the terminal device is stolen. After receiving the first OP response message, the SM-SR sends the subscription data deletion request message to the SM-DP, so as to instruct the SM-DP to delete the subscription data corresponding to the eUICC.

Specifically, after determining, according to geographical location information most recently reported by the terminal device, that the terminal device is stolen, the MNO device sends the second paging message to the terminal device, where the second paging message carries the identity information of the terminal device; after receiving the second paging message, the terminal device sends the instruction message to the eUICC, so that the eUICC initiates an OP request to the SM-SR, where the OP request carries the identity information of the terminal device and the identity information of the eUICC; after receiving the OP request, the SM-SR may determine, according to the identity information of the terminal device and the identity information of the eUICC in the OP request, that the terminal device is stolen, and then return an OP response to the eUICC by using the terminal device, where the OP response carries the theft indication used for identifying that the terminal device is stolen, so that the eUICC performs confidentiality protection processing on local data according to the theft indication.

In the case in which the terminal device is stolen, an implementation manner in which the eUICC performs confidentiality protection processing on the data in the eUICC according to the instruction message includes: deleting, by the eUICC, the data in the eUICC according to the theft indication. In addition, the eUICC may further perform encryption processing on the local data according to the theft indication. An encryption key used for encryption processing may be predetermined, or may also be provided by network side devices such as the MNO device, the SM-SR, or the like.

For a case in which the terminal device is lost, an implementation manner of the instruction message is a second OP response message. Therefore, the process of receiving, by an eUICC in a terminal device, an instruction message includes: sending, by the eUICC according to an instruction after the terminal device receives an attachment rejection response message, the second OP request message to the SM-SR by using the terminal device, where the attachment rejection response message is sent by the MNO device to the terminal device after the MNO device receives an attachment request message sent by the terminal device and determines that the terminal device is lost, and the second OP request message includes the identity information of the terminal device and the identity information of the eUICC; and receiving, by the eUICC by using the terminal device, the second OP response message returned by the SM-SR, where the second OP response message is sent by the SM-SR after the SM-SR determines, according to the identity information of the terminal device and the identity information of the eUICC, that the terminal device is lost, and the second OP response message includes a loss indication used for identifying that the terminal device is lost and an encryption key used for encrypting the data in the eUICC.

Specifically, in the case in which the terminal device is lost, an authorized user of the terminal device may initiate a loss report request to the M2M-SP device; after receiving the loss report request, the M2M-SP device may determine that the terminal device is lost; the M2M-SP device initiates a subscription pause request message to the MNO device by using the SM-SR, where the subscription pause request message carries the identity information of the terminal device, the identity information of the eUICC, and the loss indication; after receiving the subscription pause request message, the MNO device determines, according to the loss indication in the subscription pause request message, that the terminal device is lost, and the MNO device suspends an OP corresponding to the eUICC, so as to keep the eUICC in an unavailable state, thereby further preventing unauthorized access of the terminal device. The terminal device sends an attachment request message to the MNO device, so as to request access to the network of the MNO device; because the terminal device is lost, the MNO device returns an attachment rejection response message to the terminal device to reject the access of the terminal device; after receiving the attachment rejection response message, the terminal device sends an instruction message to the eUICC, so that the eUICC automatically activates a PP to initiate an OP request to the SM-SR by using the terminal device, where the OP request carries the identity information of the terminal device and the identity information of the eUICC; the SM-SR may determine, according to the identity information of the terminal device and the identity information of the eUICC, that the terminal device is lost, and add the encryption key and the loss indication to the OP response sent to the eUICC.

After receiving the second OP response message, the eUICC may learn, according to the loss indication in the second OP response message, that the terminal device is lost and confidentiality protection processing needs to be performed on the data in the eUICC. Specifically, the eUICC performs encryption processing on the data in the eUICC by using the encryption key according to the loss indication.

Optionally, after finishing encryption processing on the data in the eUICC, the eUICC may return a data encryption confirmation message to the SM-SR by using the terminal device.

It is noted here that a loss report of the authorized user has a maximum time limit, and within the time limit, the authorized user may cancel the loss report, so as to continue normal use of the eUICC and the terminal device. Based on this, in the case in which the terminal device is lost, the method in this embodiment further includes: sending, by the eUICC, a third OP request message to the SM-SR by using the terminal device, where the third OP request message includes the identity information of the terminal device and the identity information of the eUICC; receiving, by the eUICC by using the terminal device, the third OP response message sent by the SM-SR, where the third OP response message is sent after the third OP request message is received after the SM-SR determines, according to a received subscription restoration response message sent by the MNO device to the M2M-SP device, that the terminal device is held by the authorized user again, the subscription restoration response message is sent by the MNO device to the M2M-SP device after the MNO device receives the subscription restoration request message sent by the M2M-SP device, and the third OP response message includes a decryption key and a restoration indication used for identifying that the terminal device is held by the authorized user again; performing, by the eUICC, decryption processing on the data in the eUICC by using the decryption key according to the restoration indication; and sending, by the eUICC, a data restoration confirmation message to the SM-SR by using the terminal device.

It is noted here that in addition to identifying that the terminal device is held by the authorized user again, the restoration indication in the embodiments of the present invention further means that the authorized user sends a loss report cancelation request to the M2M-SP device for the terminal device.

As can be seen from the above, according to the method for data confidentiality protection based on an eUICC provided in this embodiment, after a terminal device is not held by an authorized user, an eUICC performs, in coordination with a network side device (such as an MNO device, SM-SR, and/or an M2M-SP device), confidentiality protection processing on data in the eUICC according to received instruction information, so as to implement protection on the data in the eUICC in a case in which the terminal device is stolen or lost, thereby better protecting security of personal information of a user.

Figure 4:
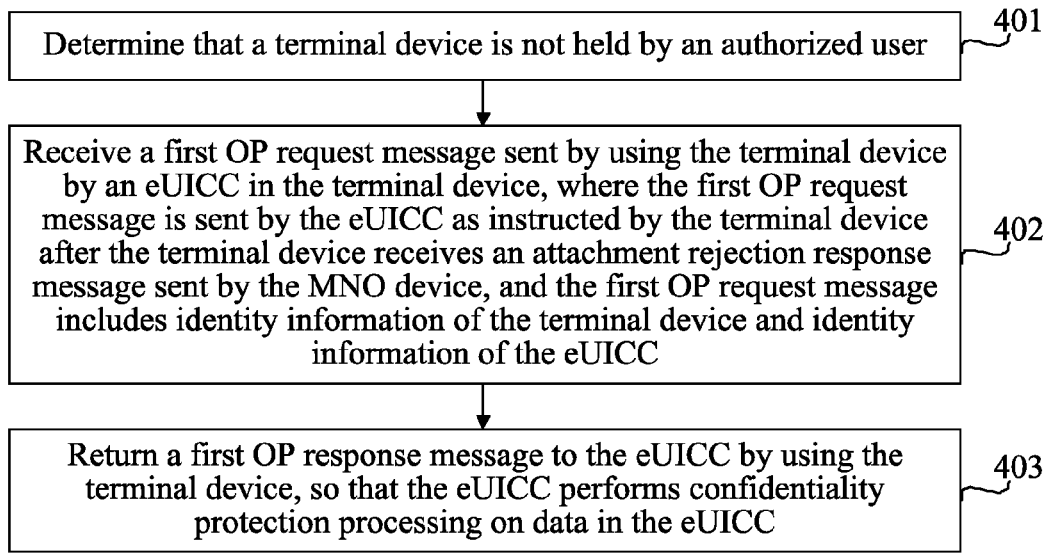
FIG. 4 is a flowchart of a method for data confidentiality protection based on an eUICC according to yet another embodiment of the present invention.

FIG. 4 is a flowchart of a method for data confidentiality protection based on an eUICC according to yet another embodiment of the present invention. As shown in FIG. 4, the method in this embodiment includes:

Step 401. Determine that a terminal device is not held by an authorized user.

Step 402. Receive a first OP request message sent by using the terminal device by an eUICC in the terminal device, where the first OP request message is sent by the eUICC as instructed by the terminal device after the terminal device receives an attachment rejection response message sent by an MNO device, and the first OP request message includes identity information of the terminal device and identity information of the eUICC.

Step 403. Return a first OP response message to the eUICC by using the terminal device, so that the eUICC performs confidentiality protection processing on data in the eUICC.

This embodiment is executed by SM-SR. For machine devices such as an MNO device, SM-SR, SM-DP, and an M2M-SP, a scenario in which a terminal device is not held by an authorized user includes cases in which the terminal device is stolen or the terminal device is lost or the like. According to different scenarios, the SM-SR determines, in different specific implementation manners, that a terminal device is not held by the authorized user.

For example, for a case in which the terminal device is stolen and is therefore not held by an authorized user: the MNO device may determine, according to the geographical location information reported by the terminal device, that the terminal device is stolen, and for a determining process, reference may be made to the description of the foregoing implementation. After determining that the terminal device is stolen, the MNO device further determines whether the terminal device is in an attached state; in a case of determining that the terminal device is in a detached state, the MNO device sends a subscription stop request message to the SM-SR, where the subscription stop request message carries the identity information of the eUICC and a theft indication that is used for identifying that the terminal device is stolen. Based on this, the process of determining, by the SM-SR, that the terminal device is not held by an authorized user includes: receiving, by the SM-SR, the subscription stop request message sent by the MNO device, where the subscription stop request message is sent by the MNO device after the MNO device determines that the terminal device is stolen and the terminal device is in a detached state, the subscription stop request message includes the identity information of the eUICC and the theft indication that is used for identifying that the terminal device is stolen. After receiving the subscription stop request message, the SM-SR determines, according to the identity information of the eUICC and the theft indication in the subscription stop request message, that the terminal device is stolen.

In the case in which the terminal device is stolen, in an optional implementation manner, after receiving the first OP response message or receiving the subscription stop request message, the SM-SR sends a subscription data deletion request message to the SM-DP, so as to instruct the SM-DP to delete subscription data corresponding to the eUICC.

Optionally, in the case in which the terminal device is stolen, the first OP response message returned by the SM-SR includes the theft indication used for identifying that the terminal device is stolen, and then the returning, by the SM-SR, a first OP response message to the eUICC by using the terminal device, so that the eUICC performs confidentiality protection processing on data in the eUICC includes: returning, by the SM-SR, the first OP response message to the eUICC by using the terminal device, so that the eUICC deletes the data in the eUICC. Alternatively, the SM-SR returns the first OP response message to the eUICC by using the terminal device, so that the eUICC performs encryption processing on the data in the eUICC.

For example, for the case in which the terminal device is stolen and is therefore not held by an authorized user: after the authorized user of the terminal device discovers that the terminal device is lost, a loss report request may be sent to an M2M-SP device, and the M2M-SP device may determine, according to the loss report request, that the terminal device is lost. Next, the M2M-SP device sends a subscription pause request message to the SM-SR, where the subscription pause request message carries the identity information of the terminal device, the identity information of the eUICC, and a loss indication used for identifying that the terminal device is lost. Based on this, the determining, by the SM-SR, that a terminal device is not held by an authorized user includes: receiving, by the SM-SR, the subscription pause request message sent by the M2M-SP device, and forwarding the subscription pause request message to the MNO device, so that the MNO device determines that the terminal device is lost, where the subscription pause request message includes the identity information of the terminal device, the identity information of the eUICC, and the loss indication. In the process, the SM-SR may also determine, according to the loss indication in the subscription pause request message, that the terminal device is lost.

Optionally, in the case in which the terminal device is lost, after receiving the subscription pause request message, the MNO device sends a subscription pause response message to the M2M-SP device by using the SM-SR. The SM-SR further receives the subscription pause response message sent by the MNO device, and forwards the subscription pause response message to the M2M-SP device, where the subscription pause response message includes the identity information of the terminal device and the identity information of the eUICC.

Optionally, in the case in which the terminal device is lost, the first OP response message returned by the SM-SR includes the loss indication used for identifying that the terminal device is lost and an encryption key used for encrypting the data in the eUICC, and then the returning, by the SM-SR, a first OP response message to the eUICC by using the terminal device, so that the eUICC performs confidentiality protection processing on data in the eUICC includes: returning, by the SM-SR, the first OP response message to the eUICC by using the terminal device, so that the eUICC performs encryption processing on the data in the eUICC.

Optionally, in the case in which the terminal device is lost, the method in this embodiment further includes: receiving a second OP request message sent by using the terminal device by the eUICC, where the second OP request message includes the identity information of the terminal device and the identity information of the eUICC; sending a second OP response message to the eUICC by using the terminal device, where the second OP response message is sent after the second OP request message is received after it is determined according to a received subscription restoration response message sent by the MNO device to the M2M-SP device that the terminal device is held by the authorized user again, the subscription restoration response message is sent by the MNO device to the M2M-SP device after the MNO device receives the subscription restoration request message sent by the M2M-SP device, the second OP response message includes a decryption key and a restoration indication that is used for identifying that the terminal device is held by the authorized user again, so that the eUICC performs decryption processing on the data in the eUICC by using the decryption key according to the restoration indication; and receiving a data restoration confirmation message sent by using the terminal device by the eUICC.

It is described here that, in the case in which the terminal device is lost, the first OP request message and the first OP response message in this embodiment are equivalent to the second OP request message and the second OP response message in other method embodiments, respectively; correspondingly, the second OP request message and the second OP response message in this embodiment are equivalent to the third OP request message and the third OP response message in other method embodiments, respectively.

As can be seen from the above, according to the method for data confidentiality protection based on an eUICC provided in this embodiment, in a case in which a terminal device is not held by an authorized user, for example the terminal device is stolen or lost, SM-SR returns an OP response for an OP request sent by an eUICC and adds an indication used for identifying that the terminal device is stolen or lost to the OP response, so that the eUICC may perform confidentiality protection processing on data in the eUICC according to the indication, so as to implement protection on the data in the eUICC in the case in which the terminal device is stolen or lost or the like, thereby better protecting security of personal information of a user.

Figure 5:
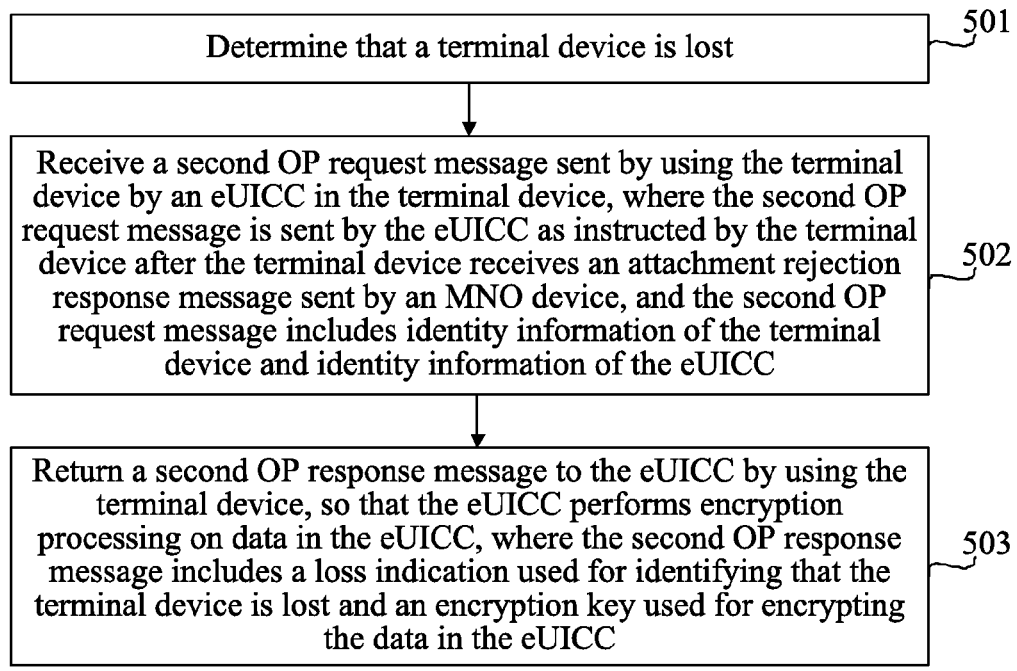
FIG. 5 is a flowchart of a method for data confidentiality protection based on an eUICC in a case in which a terminal device is lost according to an embodiment of the present invention.

FIG. 5 is a flowchart of a method for data confidentiality protection based on an eUICC in a case in which a terminal device is lost according to an embodiment of the present invention. As shown in FIG. 5, the method in this embodiment includes:

Step 501. Determine that a terminal device is lost.

Step 502. Receive a second OP request message sent by using the terminal device by an eUICC in the terminal device, where the second OP request message is sent by the eUICC as instructed by the terminal device after the terminal device receives an attachment rejection response message sent by an MNO device, and the second OP request message includes identity information of the terminal device and identity information of the eUICC.

Step 503. Return a second OP response message to the eUICC by using the terminal device, so that the eUICC performs encryption processing on data in the eUICC, where the second OP response message includes a loss indication used for identifying that the terminal device is lost and an encryption key used for encrypting the data in the eUICC.

This embodiment is executed by SM-SR. This embodiment is applicable to a case in which the terminal device is lost. Specifically, after an authorized user of the terminal device discovers that the terminal device is lost, a loss report request may be sent to an M2M-SP device, and the M2M-SP device may determine, according to the loss report request, that the terminal device is lost. Next, the M2M-SP device sends a subscription pause request message to the SM-SR, and correspondingly, the SM-SR receives the subscription pause request message sent by the M2M-SP device, and forwards the subscription pause request message to an MNO device, so that the MNO device determines that the terminal device is lost, where the subscription pause request message includes the identity information of the terminal device, the identity information of the eUICC, and the loss indication. In the process, the SM-SR may also determine, according to the loss indication in the subscription pause request message, that the terminal device is lost.

Optionally, after receiving the subscription pause request message, the MNO device sends a subscription pause response message to the M2M-SP device by using the SM-SR. The SM-SR further receives the subscription pause response message sent by the MNO device, and forwards the subscription pause response message to the M2M-SP device, where the subscription pause response message includes the identity information of the terminal device and the identity information of the eUICC.

It is noted here that the loss report of the authorized user has a maximum time limit, and within the time limit, the authorized user may cancel the loss report, so as to continue normal use of the eUICC and the terminal device. Based on this, in the case in which the terminal device is lost, the method in this embodiment further includes: receiving a third OP request message sent by using the terminal device by the eUICC, where the third OP request message includes the identity information of the terminal device and the identity information of the eUICC; sending a third OP response message to the eUICC by using the terminal device, where the third OP response message is sent after the third OP request message is received after it is determined according to a received subscription restoration response message sent by the MNO device to the M2M-SP device that the terminal device is held by the authorized user again, the subscription restoration response message is sent by the MNO device to the M2M-SP device after the MNO device receives a subscription restoration request message sent by the M2M-SP device, the third OP response message includes a decryption key and a restoration indication that is used for identifying that the terminal device is held by the authorized user again, so that the eUICC performs decryption processing on the data in the eUICC by using the decryption key according to the restoration indication; and receiving a data restoration confirmation message sent by using the terminal device by the eUICC.

As can be seen from the above, according to the method for data confidentiality protection based on an eUICC provided in this embodiment, in a case in which a terminal device is lost, SM-SR returns an OP response for an OP request sent by an eUICC, where the OP response carries a loss indication used for identifying that the terminal device is lost, so that the eUICC may delete data in the eUICC according to the loss indication, so as to implement protection on the data in the eUICC in the case in which the terminal device is lost, thereby better protecting security of personal information of a user.

Figure 6:
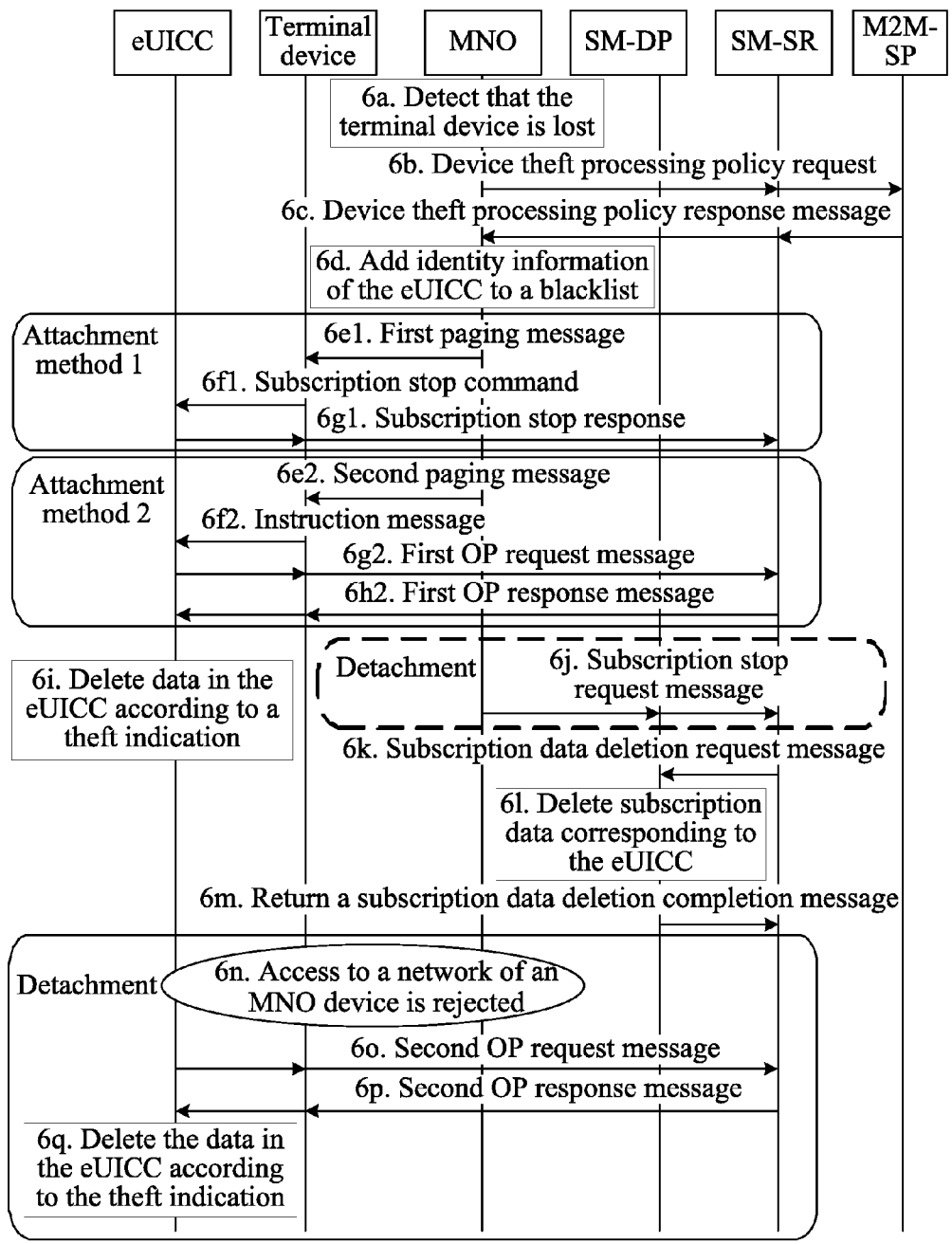
FIG. 6 is a flowchart of a method for data confidentiality protection based on an eUICC according to yet another embodiment of the present invention.

FIG. 6 is a flowchart of a method for data confidentiality protection based on an eUICC according to yet another embodiment of the present invention. As shown in FIG. 6, the method in this embodiment includes:

Step 6a. An MNO device detects that a terminal device is stolen.

Because many terminal devices have a low mobility characteristic, a user may customize in subscription an authorized use region of a terminal device in advance, and store the authorized use region in the MNO device. The terminal device periodically reports geographical location information of the terminal device to the MNO device by using signaling. The MNO device may compare the geographical location information reported by the terminal device and the authorized use region of the terminal device in subscription data of the user, and determine whether the geographical location information reported by the terminal device belongs to the authorized use region, so as to conclude through analysis whether the terminal device is stolen. If the geographical location information reported by the terminal device does not belong to the authorized use region of the terminal device, the MNO device may determine that the terminal device is stolen, and otherwise, determine that the terminal device is not stolen (that is, is still held by the authorized user).

Step 6b. The MNO device initiates a device theft processing policy request to an M2M-SP device by using the SM-SR, where the device theft processing policy request carries identity information of the terminal device, identity information of an eUICC, and the geographical location information reported by the terminal device.

Step 6c. The M2M-SP device determines, according to the identity information of the terminal device, the identity information of the eUICC, and the geographical location information reported by the terminal device, a case in which the terminal device is stolen, and returns a device theft processing policy response message to the MNO device by using the SM-SR, where the device theft processing policy response message carries a theft processing indication.

When a geographical location of a terminal device with low mobility changes, it is very likely that the terminal device is stolen; however, the cause may also be system maintenance (for example, universal maintenance of all terminal devices at a location) organized by the M2M-SP device. In these special cases, an incorrect operation may occur if it is directly determined that the terminal device is stolen, which affects a service of the terminal device, and based on this, the MNO device may acquire, from the M2M-SP device, a processing indication of whether the terminal device is stolen.

Step 6b and step 6c are optional steps.

Step 6d. The MNO device determines, according to the theft processing indication, that the terminal device is really stolen, and adds the identity information of the eUICC to a blacklist.

In view of that the MNO device detects, based on geographical location information most recently reported by the terminal device, that the terminal device is stolen, the terminal device may be in an attached state, or may also be in a detached state (also referred to as an unattached state). For a case in which the terminal device is in an attached state, in this embodiment, the following two paging methods are used to guide the eUICC to delete local data.

Step 6e1. The MNO device sends a first paging message to the terminal device, where the first paging message carries the identity information of the terminal device and a theft indication. The first paging message here is an enhanced paging message.

Step 6f1. The terminal device sends a subscription stop command to the eUICC, where the subscription stop command carries the identity information of the terminal device and the theft indication.

Step 6g1. The eUICC sends a subscription stop response to the SM-SR by using the terminal device, where the subscription stop response carries the identity information of the terminal device, the identity information of the eUICC, and the theft indication, and then executes step 6k.

Step 6e2. The MNO device sends a second paging message to the terminal device, where the second paging message carries the identity information of the terminal device.

Step 6f2. The terminal device sends an instruction message to the eUICC, so as to instruct the eUICC to initiate an OP request to the SM-SR.

Step 6g2. The eUICC sends a first OP request message to the SM-SR by using the terminal device, where the first OP request message carries the identity information of the terminal device and the identity information of the eUICC.

Step 6h2. The SM-SR determines, according to the identity information of the terminal device and the identity information of the eUICC, that the terminal device is stolen, sends a first OP response message, which curries carries the theft indication, to the eUICC, and then executes step 6k.

Step 6i. The eUICC deletes data in the eUICC according to the theft indication, where the local data deleted by the eUICC includes, but is not limited to, an OP, a PP, and user data.

The foregoing step 6e1, step 6f1, step 6g1, and step 6i are procedures of guiding the eUICC to delete the local data in the provided first paging method in a case in which the terminal device is in an attached state.

The foregoing step 6e2, step 6f2, step 6g2, step 6h2, and step 6i are procedures of guiding the eUICC to delete the local data in the provided second paging method in the case in which the terminal device is in an attached state.

Step 6j. The MNO device initiates a subscription stop request message to the SM-SR, where the subscription stop request message carries the identity information of the eUICC and the theft indication, and then executes step 6k.

Step 6k. The SM-SR sends a subscription data deletion request message to the SM-DP, where the subscription data deletion request message carries the identity information of the eUICC.

Step 6l. The SM-DP deletes subscription data corresponding to the eUICC according to the identity information of the eUICC.

Step 6m. The SM-DP returns subscription data deletion completion message to the SM-SR.

Step 6n. The terminal device attempts to access an MNO network and is rejected.

Step 6n specifically includes: sending, by the terminal device, an attachment request message to the MNO device, then receiving an attachment rejection response message returned by the MNO device, and after the attachment rejection response message is received, sending an instruction message to the eUICC, so that the eUICC initiates an OP request to the SM-SR.

Step 6o. The eUICC automatically activates the PP in the eUICC, and sends a second OP request message to the SM-SR by using the terminal device, where the second OP request message carries the identity information of the terminal device and the identity information of the eUICC.

Step 6p. The SM-SR determines, according to the identity information of the terminal device and the identity information of the eUICC, that the terminal device is stolen, and sends a second OP response message to the eUICC by using the terminal device, where the second OP response message carries the theft indication.

Step 6q. The eUICC deletes the data in the eUICC according to the theft indication, where the local data deleted by the eUICC includes, but is not limited to, the OP, the PP, and the user data.

The foregoing step 6j, step 6n, and step 6q are procedures of guiding the eUICC to delete the local data in a case in which the terminal device is in a detached state case.

Step 6k to step 6m are processing procedures on a network side, and the procedures are not limited by whether the terminal device is in an attached state or a detached state.

In this embodiment, the identity of the terminal device carried in the first paging message and the second paging message is an IMSI, and the identity information of the terminal device carried in other messages is an IMEI.

As can be seen from the above, according to the method provided in this embodiment, after detecting that a terminal device is stolen, an MNO device in one aspect adds identity information of an eUICC in a terminal device to a blacklist, so as to forbid unauthorized access of the terminal device to a network of the MNO device, and in another aspect attempts to guide the eUICC to perform a deletion operation on the local data, thereby better protecting security of personal information of a user.

Figure 7A:
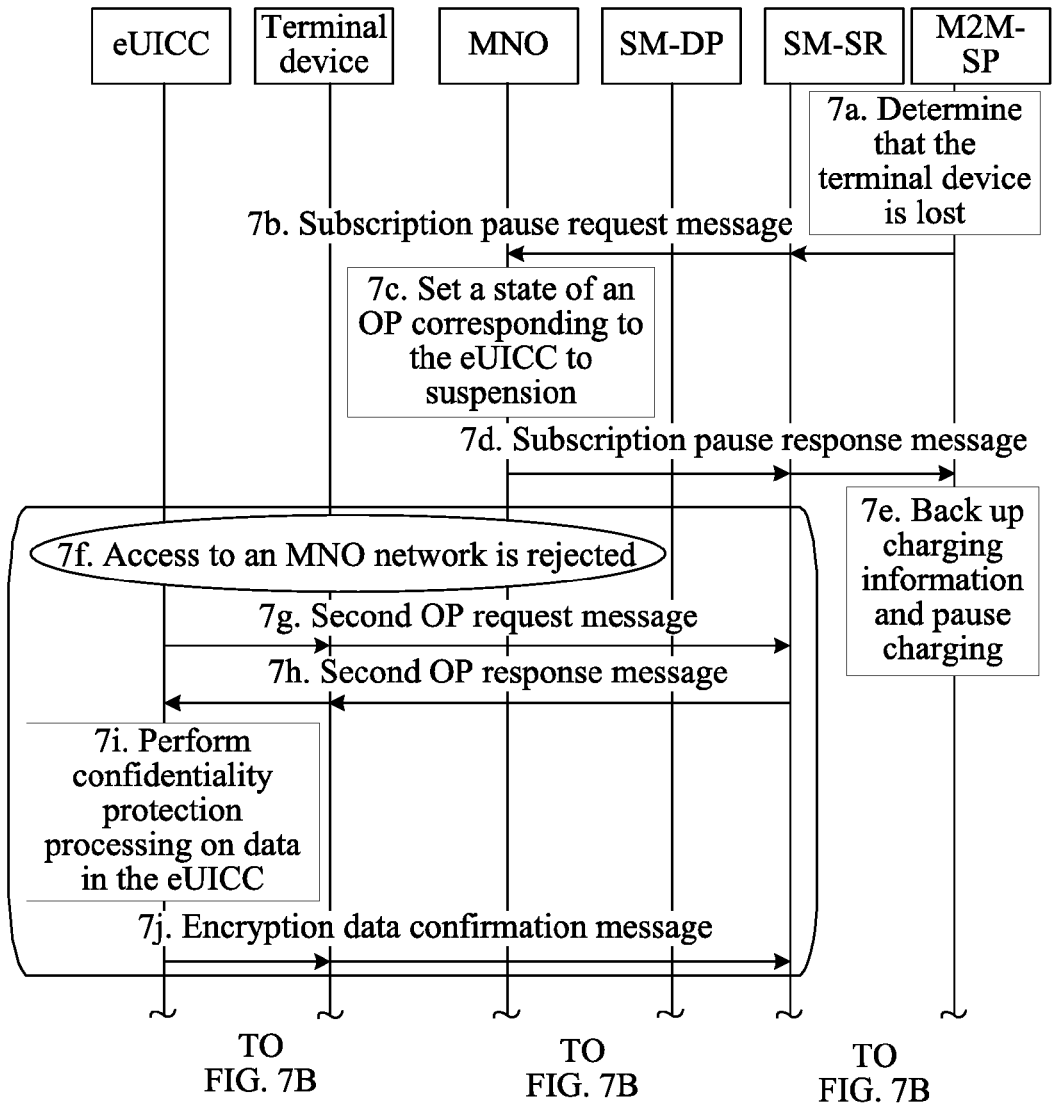
FIG. 7A and FIG. 7B are a flowchart of a method for data confidentiality protection based on an eUICC according to yet another embodiment of the present invention.
Figure 7B:
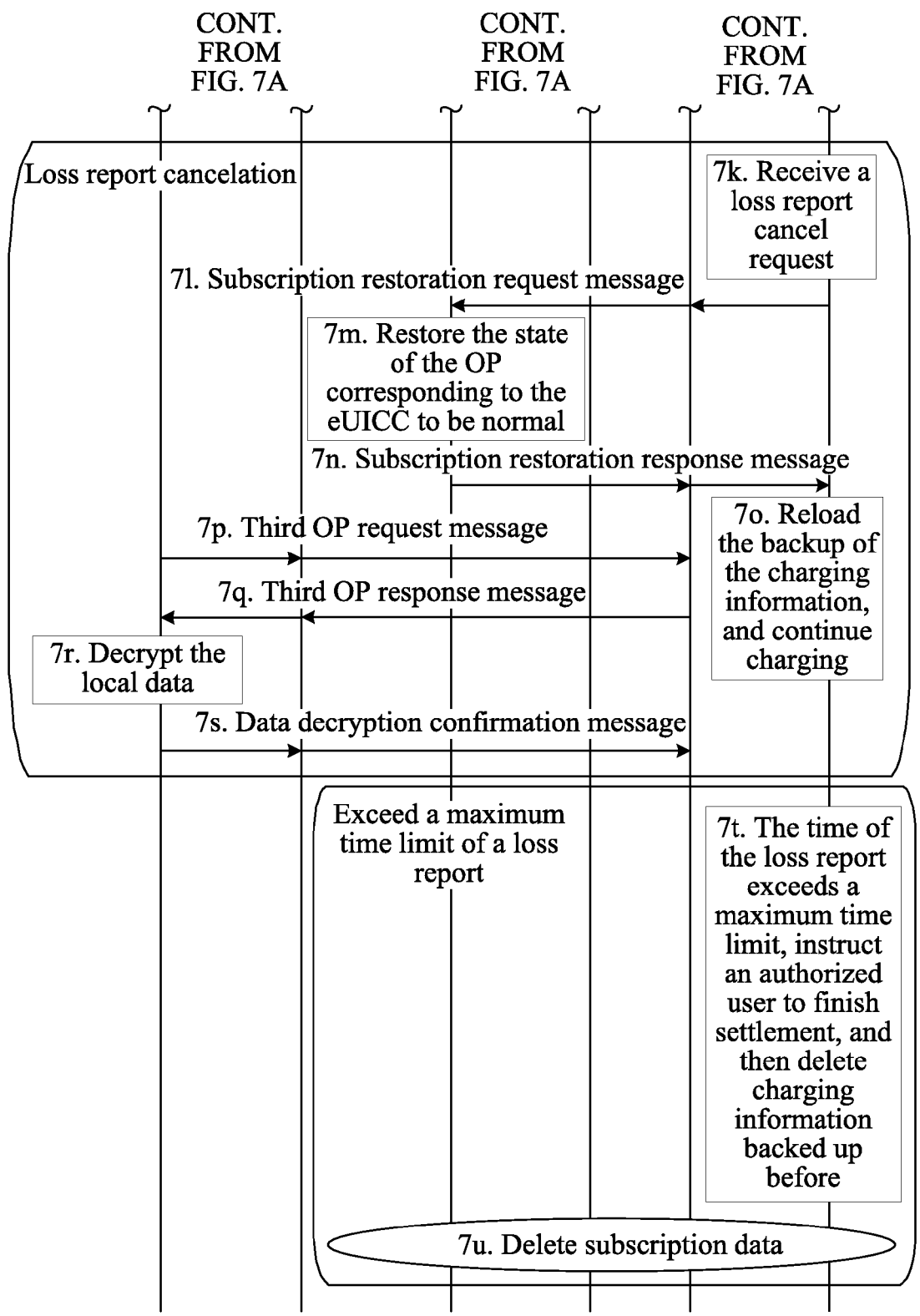

FIG. 7A and FIG. 7B are a flowchart of a method for data confidentiality protection based on an eUICC according to yet another embodiment of the present invention. As shown in FIG. 7A and FIG. 7B, the method in this embodiment includes:

Step 7a. An M2M-SP device determines, according to a loss report request initiated by an authorized user of a terminal device, that the terminal device is lost.

Step 7b. The M2M-SP device sends a subscription pause request message to an MNO device by using SM-SR, where the subscription pause request message carries identity information of the terminal device, identity information of an eUICC, and a loss indication used for identifying that the terminal device is lost.

Step 7c. The MNO device sets a state of an OP corresponding to the eUICC to suspension.

Step 7d. The MNO device returns a subscription pause response message to the M2M-SP device by using the SM-SR, where the subscription pause response message carries the identity information of the terminal device and the identity information of the eUICC.

Step 7e. The M2M-SP device backs up charging information of the terminal device and pauses charging.

Step 7f. Before the authorized user cancels a loss report, the terminal device attempts to access an MNO network and is rejected.

Step 7f specifically includes: sending, by the terminal device, an attachment request message to the MNO device, receiving an attachment rejection response message returned by the MNO device, and after the attachment rejection response message is received, sending an instruction message to the eUICC, so that the eUICC initiates an OP request to the SM-SR.

Step 7g. The eUICC automatically activates a PP and sends a second OP request message to the SM-SR by using the terminal device, where the second OP request message carries the identity information of the terminal device and the identity information of the eUICC.

Step 7h. The SM-SR determines, according to the identity information of the terminal device and the identity information of the eUICC, that the terminal device is lost, and sends a second OP response message to the eUICC by using the terminal device, where the second OP response message carries the loss indication and an encryption key.

Step 7i. The eUICC performs encryption processing on data in the eUICC by using the encryption key according to the loss indication, where local data encrypted by the eUICC includes, but is not limited to, an OP and user data.

Step 7j. The eUICC returns a data encryption confirmation message to the SM-SR by using the terminal device.

The loss report of the authorized user for the terminal device has a maximum time limit, and within the maximum time limit, the authorized user may cancel the loss report if the authorized user finds the terminal device, so as to continue normal use of the eUICC and the terminal device. Based on this, the method in this embodiment further includes the following optional steps:

Step 7k. The M2M-SP device receives a loss report cancelation request for the terminal device.

Step 7l. The M2M-SP device sends a subscription restoration request message to the MNO device by using the SM-SR, where the subscription restoration request message carries the identity information of the terminal device, the identity information of the eUICC, and a restoration indication.

Step 7m. The MNO device restores a state of the OP corresponding to the eUICC to be normal.

Step 7n. The MNO device returns a subscription restoration response message to the M2M-SP device by using the SM-SR, where the subscription restoration response message carries the identity information of the terminal device and the identity information of the eUICC.

Step 7o. The M2M-SP device reloads a backup of the charging information, and continues performing charging on the terminal device.

Step 7p. The eUICC sends a third OP request message to the SM-SR by using the terminal device, where the third OP request message carries the identity information of the terminal device and the identity information of the eUICC.

Step 7q. The SM-SR determines, according to the identity information of the terminal device and the identity information of the eUICC, that the loss report of the terminal device is canceled, and returns a third OP response message to the eUICC, where the third OP response message carries a decryption key and the restoration indication.

Step 7r. The eUICC decrypts the local data by using the decryption key according to the restoration indication.

Step 7s. The eUICC returns a data decryption confirmation message to the SM-SR by using the terminal device.

If the authorized user still fails to find the terminal device when the maximum time limit ends, the method in this embodiment further includes operations of requiring a user to finish settlement and deleting subscription data on a network side. As shown in FIG. 7A and FIG. 7B, the method in this embodiment further includes the following optional steps:

Step 7t. The M2M-SP device detects that the time of the loss report of the terminal device exceeds the maximum time limit, instructs the authorized user of the terminal device to finish settlement, and then deletes charging information backed up before.

Step 7u. The SM-DP, MNO device, SM-SR on the network side delete subscription data corresponding to the terminal device.

As can be seen from the above, according to the method provided in this embodiment, after an M2M-SP device learns that a terminal device is lost, in one aspect, the M2M-SP device commands an MNO device to temporarily suspend an OP corresponding to an eUICC in the terminal device to pause subscription, so as to forbid unauthorized access of the terminal device to a network of the MNO device, and in another aspect, before the loss report of the terminal device is canceled, when the terminal device attempts to access the network of the MNO device and is rejected, SM-SR delivers an encryption key to the eUICC to guide the eUICC to perform an encryption operation on local data, thereby better protecting security of personal information of a user. In addition, when an authorized user requests cancelation of the loss report, a subscription state on a network side is restored first, and when the eUICC contacts with the SM-SR by using the terminal device, the SM-SR delivers an decryption key to the eUICC, so as to finish the decryption operation on the data in the eUICC.

Figure 8:
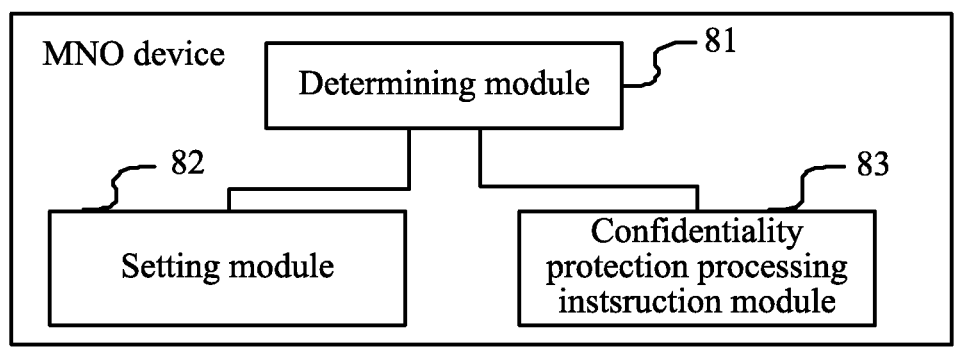
FIG. 8 is a schematic structural diagram of an MNO device according to an embodiment of the present invention.

FIG. 8 is a schematic structural diagram of an MNO device according to an embodiment of the present invention. As shown in FIG. 8, the MNO device in this embodiment includes: a determining module 81, a setting module 82, and a confidentiality protection processing instruction module 83.

The determining module 81 is configured to determine that a terminal device is not held by an authorized user.

The setting module 82 is configured to: after the determining module 81 determines that the terminal device is not held by the authorized user, set an eUICC in the terminal device to an unavailable state.

The confidentiality protection processing instruction module 83 is configured to: after the determining module 81 determines that the terminal device is not held by the authorized user, instruct, by using the terminal device, the eUICC to perform confidentiality protection processing on data in the eUICC.

Figure 9:
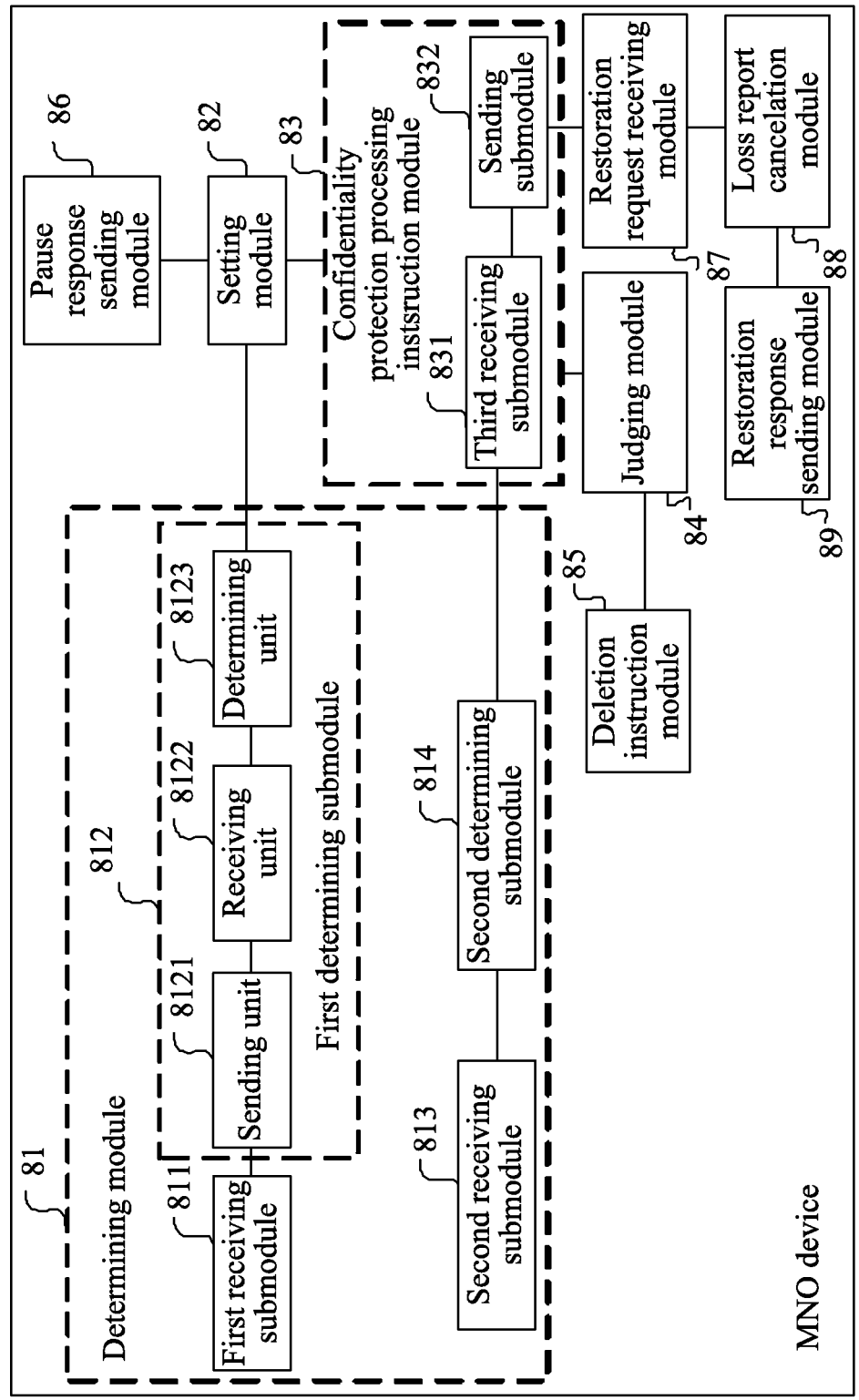
FIG. 9 is a schematic structural diagram of an MNO device according to another embodiment of the present invention.

In an optional implementation manner, as shown in FIG. 9, an implementation structure of the determining module 81 includes: a first receiving submodule 811 and a first determining submodule 812.

The first receiving submodule 811 is configured to receive geographical location information of the terminal device reported by the terminal device. The first determining submodule 812 is connected to the first receiving submodule 811 and is configured to: when the geographical location information received by the first receiving submodule 811 does not belong to a preset authorized use region of the terminal device, determine that the terminal device is stolen.

Optionally, an implementation structure of the first determining submodule 812 includes: a sending unit 8121, a receiving unit 8122, and a determining unit 8123.

The sending unit 8121 is connected to the first receiving submodule 811 and is configured to: after it is determined that the geographical location information received by the first receiving submodule 811 does not belong to the preset authorized use region of the terminal device, send a device theft processing policy request message to an M2M-SP device, where the device theft processing policy request message includes identity information of the terminal device, identity information of the eUICC, and the geographical location information.

The receiving unit 8122 is configured to receive a device theft processing policy response message sent by the M2M-SP device, where the device theft processing policy response message is sent by the M2M-SP device after the M2M-SP device determines, according to the identity information of the terminal device, the identity information of the eUICC, and the geographical location information, that the terminal device is stolen, and the device theft processing policy response message includes a theft processing indication. Optionally, the receiving unit 8122 is connected to the sending unit 8121 and is configured to receive the device theft processing policy response message after the sending unit 8121 sends the device theft processing policy request message.

The determining unit 8123 is connected to the receiving unit 8122 and is configured to determine, according to the theft processing indication received by the receiving unit 8122, that the terminal device is stolen.

Based on the foregoing case in which the terminal device is stolen, the setting module 82 is specifically configured to add the identity information of the eUICC in the terminal device to a blacklist, so as to keep the eUICC in an unavailable state.

Based on the foregoing case in which the terminal device is stolen, the confidentiality protection processing instruction module 83 is specifically configured to instruct, by using the terminal device, the eUICC to delete the data in the eUICC.

Based on the foregoing case in which the terminal device is stolen, the confidentiality protection processing instruction module 83 may be specifically configured to send a first paging message to the terminal device, so that the terminal device sends a subscription stop command to the eUICC, and the eUICC performs confidentiality protection processing on the data in the eUICC according to the subscription stop command, where the first paging message includes the identity information of the terminal device and a theft indication that is used for identifying that the terminal device is stolen, the subscription stop command includes the identity information of the terminal device and the theft indication. Optional, the confidentiality protection processing instruction module 83 may be specifically configured to send a second paging message to the terminal device, so that the terminal device instructs the eUICC to send a first OP request message to SM-SR and perform, after a first OP response message returned by the SM-SR is received, confidentiality protection processing on the data in the eUICC, where the second paging message includes the identity information of the terminal device, the first OP request message includes the identity information of the terminal device, and the identity information of the eUICC, the first OP response message is sent by the SM-SR after the SM-SR determines, according to the identity information of the terminal device and the identity information of the eUICC, that the terminal device is stolen, and the first OP response message includes the theft indication.

Based on the foregoing, as shown in FIG. 9, the MNO device in this embodiment further includes: a judging module 84. The judging module 84 is connected to the confidentiality protection processing instruction module 83 and is configured to: before the confidentiality protection processing instruction module 83 instructs the eUICC to perform confidentiality protection processing on the data in the eUICC, determine whether the terminal device is in an attached state, and when it is determined that terminal device is in an attached state, trigger the confidentiality protection processing instruction module 83 to instruct, by using the terminal device, the eUICC to perform confidentiality protection processing on the data in the eUICC.

Further optionally, as shown in FIG. 9, the MNO device in this embodiment further includes: a deletion instruction module 85. The deletion instruction module 85 is connected to the judging module 84 and is configured to: when the judging module 84 determines that the terminal device is in a detached state, send a subscription stop request message to the SM-SR, so that the SM-SR instructs SM-DP to delete subscription data corresponding to the eUICC, where the subscription stop request message includes the identity information of the eUICC and the theft indication that is used for identifying that the terminal device is stolen.

In an optional implementation manner, as shown in FIG. 9, another implementation structure of the determining module 81 includes: a second receiving submodule 813 and a second determining submodule 814.

The second receiving submodule 813 is configured to receive a subscription pause request message sent by the M2M-SP device, where the subscription pause request message includes the identity information of the terminal device, the identity information of the eUICC, and a loss indication used for identifying that the terminal device is lost, and the M2M-SP device determines, according to a loss report request from the authorized user of the terminal device, that the terminal device is lost.

The second determining submodule 814 is connected to the second receiving submodule 813 and is configured to determine, according to the loss indication received by the second receiving submodule 813, that the terminal device is lost.

Based on the foregoing case in which the terminal device is lost, the setting module 82 may be specifically configured to suspend an OP corresponding to the eUICC, so as to keep the eUICC in an unavailable state. Based on this, the MNO device in this embodiment further includes: a pause response sending module 86.

The pause response sending module 86 is connected to the setting module 82 and is configured to: after the setting module 82 suspends the OP corresponding to the eUICC, send a subscription pause response message to the M2M-SP device, where the subscription pause response message includes the identity information of the terminal device and the identity information of the eUICC.

Based on the foregoing case in which the terminal device is lost, as shown in FIG. 9, an implementation structure of the confidentiality protection processing instruction module 83 includes: a third receiving submodule 831 and a sending submodule 832.

The third receiving submodule 831 is configured to receive an attachment request message sent by the terminal device.

The sending submodule 832 is connected to the third receiving submodule 831 and is configured to: after the third receiving submodule 831 receives the attachment request message, return an attachment rejection response message to the terminal device, so that the terminal device instructs the eUICC to send a second OP request message to the SM-SR and perform, after a second OP response message returned by the SM-SR is received, encryption processing on the data in the eUICC, where the second OP request message includes the identity information of the terminal device and the identity information of the eUICC, the second OP response message is sent by the SM-SR after the SM-SR determines, according to the identity information of the terminal device and the identity information of the eUICC, that the terminal device is lost, and the second OP response message includes the loss indication and an encryption key that is used for encrypting the data in the eUICC.

Based on the foregoing, as shown in FIG. 9, the MNO device in this embodiment further includes: a restoration request receiving module 87, a loss report cancelation module 88, and a restoration response sending module 89.

The restoration request receiving module 87 is configured to receive a subscription restoration request message sent by using the SM-SR by the M2M-SP device, where the subscription restoration request message includes the identity information of the terminal device, the identity information of the eUICC, and a restoration indication used for identifying that the terminal device is held by the authorized user again. Optionally, the restoration request receiving module 87 is connected to the sending submodule 832.

The loss report cancelation module 88 is connected to the restoration request receiving module 87 and is configured to: when the restoration request receiving module 87 receives the subscription restoration request message, and cancel a loss report for the OP corresponding to the eUICC, so that the eUICC is restored to an available state.

The restoration response sending module 89 is connected to the loss report cancelation module 88 and is configured to: after the loss report cancelation module 88 cancels the loss report for the OP corresponding to the eUICC, send a subscription restoration response message to the M2M-SP device by using the SM-SR, where the subscription restoration response message includes the identity information of the terminal device and the identity information of the eUICC.

The functional modules in the MNO device provided in this embodiment may be configured to execute corresponding procedures in the method for data confidentiality protection shown in FIG. 2, the specific working principle thereof is no longer elaborated, and for details, refer to the description of the method embodiment.

After determining that a terminal device is not held by an authorized user, the MNO device in this embodiment sets an eUICC in the terminal device to an unavailable state, so as to forbid unauthorized access of the terminal device to a network of the MNO device, and instructs, by using the terminal device, the eUICC to perform confidentiality protection processing on data in the eUICC, so as to implement protection on the data in the eUICC in a case in which the terminal device is stolen or lost, thereby better protecting security of personal information of a user.

Figure 10:
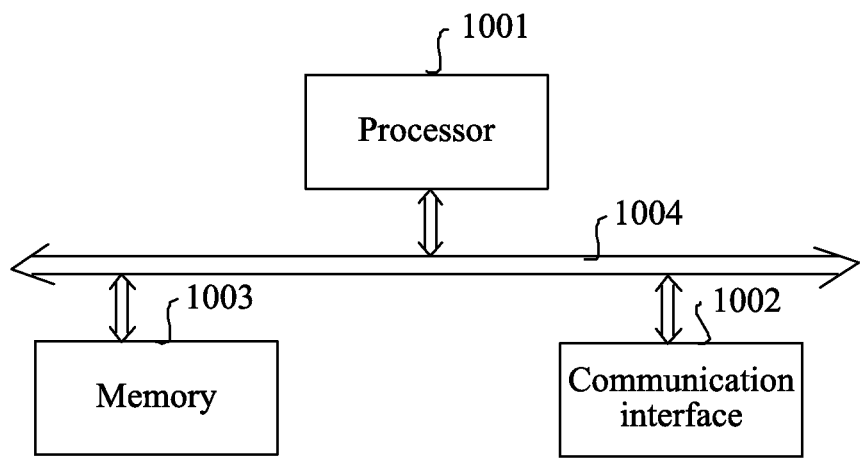
FIG. 10 is a schematic structural diagram of an MNO device according to yet another embodiment of the present invention.

FIG. 10 is a schematic structural diagram of an MNO device according to yet another embodiment of the present invention. As shown in FIG. 10, the MNO device in this embodiment includes: a processor 1001, a communication interface 1002, a memory 1003, and a bus 1004. The processor 1001, the communication interface 1002, and the memory 1003 are connected to each other and communicate with each other by using the bus 1004. The bus 1004 may be an Industry Standard Architecture (Industry Standard Architecture, briefly referred to as ISA) bus, a Peripheral Component Interconnect (Peripheral Component Interconnect, briefly referred to as PCI) bus or an Extended Industry Standard Architecture (Extended Industry Standard Architecture, briefly referred to as EISA) bus or the like. The bus 1004 may be classified into an address bus, a data bus, a control bus, and the like. For ease of representation, the bus 1004 is only represented by a thick line in FIG. 10; however, it does not represent that there is only one bus or one type of bus 1004.

The memory 1003 is configured to store a program. Specifically, the program may include program code, and the program code includes a computer operation instruction. In addition to the program, the memory 1003 may further store data received or sent by the communication interface 1002.

The memory 1003 may include a high-speed RAM memory, or may further include a non-volatile memory (non-volatile memory in English), such as at least one magnetic disk memory.

The processor 1001 is configured to execute the program stored by the memory 1003, so as to implement the following: determining that a terminal device is not held by an authorized user, and setting an eUICC in the terminal device to an unavailable state.

The communication interface 1002 is configured to instruct, by using the terminal device, the eUICC to perform confidentiality protection processing on data in the eUICC.

Optionally, the communication interface 1002 may be controlled by the processor 1001 to instruct, by using the terminal device, the eUICC to perform confidentiality protection processing on the data in the eUICC. For example, the processor 1001 sends an instruction to the communication interface 1002 by using the bus between the processor 1001 and the communication interface 1002, and the communication interface 1002, instructs, by using the terminal device according to the instruction from the processor 1001, the eUICC to perform confidentiality protection processing on the data in the eUICC.

The processor 1001 may be a central processing unit (Central Processing Unit, briefly referred to as CPU), or an application specific integrated circuit (Application Specific Integrated Circuit, briefly referred to as ASIC), or one or more integrated circuits configured to implement the embodiment of the present invention.

The MNO device provided in this embodiment may be configured to execute a corresponding procedure in the method for data confidentiality protection shown in FIG. 2, the specific working principle thereof is no longer elaborated, and for details, refer to the description of the method embodiments.

After determining that a terminal device is not held by an authorized user, the MNO device in this embodiment sets an eUICC in the terminal device to an unavailable state, so as to forbid unauthorized access of the terminal device to a network of the MNO device, and instructs, by using the terminal device, the eUICC to perform confidentiality protection processing on data in the eUICC, so as to implement protection on the data in the eUICC in a case in which the terminal device is stolen or lost, thereby better protecting security of personal information of a user.

Figure 11:
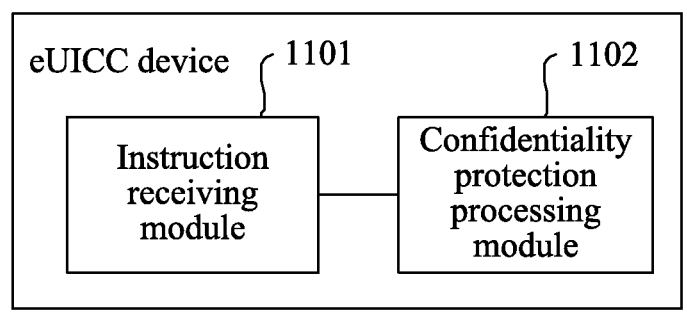
FIG. 11 is a schematic structural diagram of an eUICC device according to an embodiment of the present invention.

FIG. 11 is a schematic structural diagram of an eUICC device according to an embodiment of the present invention. The eUICC device in this embodiment is embedded in a terminal device. As shown in FIG. 11, the eUICC device in this embodiment includes: an instruction receiving module 1101 and a confidentiality protection processing module 1102.

The instruction receiving module 1101 is configured to receive an instruction message, where the instruction message is used for instructing, when the terminal device is not held by an authorized user, the eUICC device in this embodiment embedded in the terminal device to perform confidentiality protection processing on data in the eUICC device.

The confidentiality protection processing module 1102 is connected to the instruction receiving module 1101 and is configured to perform confidentiality protection processing on the data in the eUICC device in this embodiment according to the instruction message received by the instruction receiving module 1101.

Figure 12:
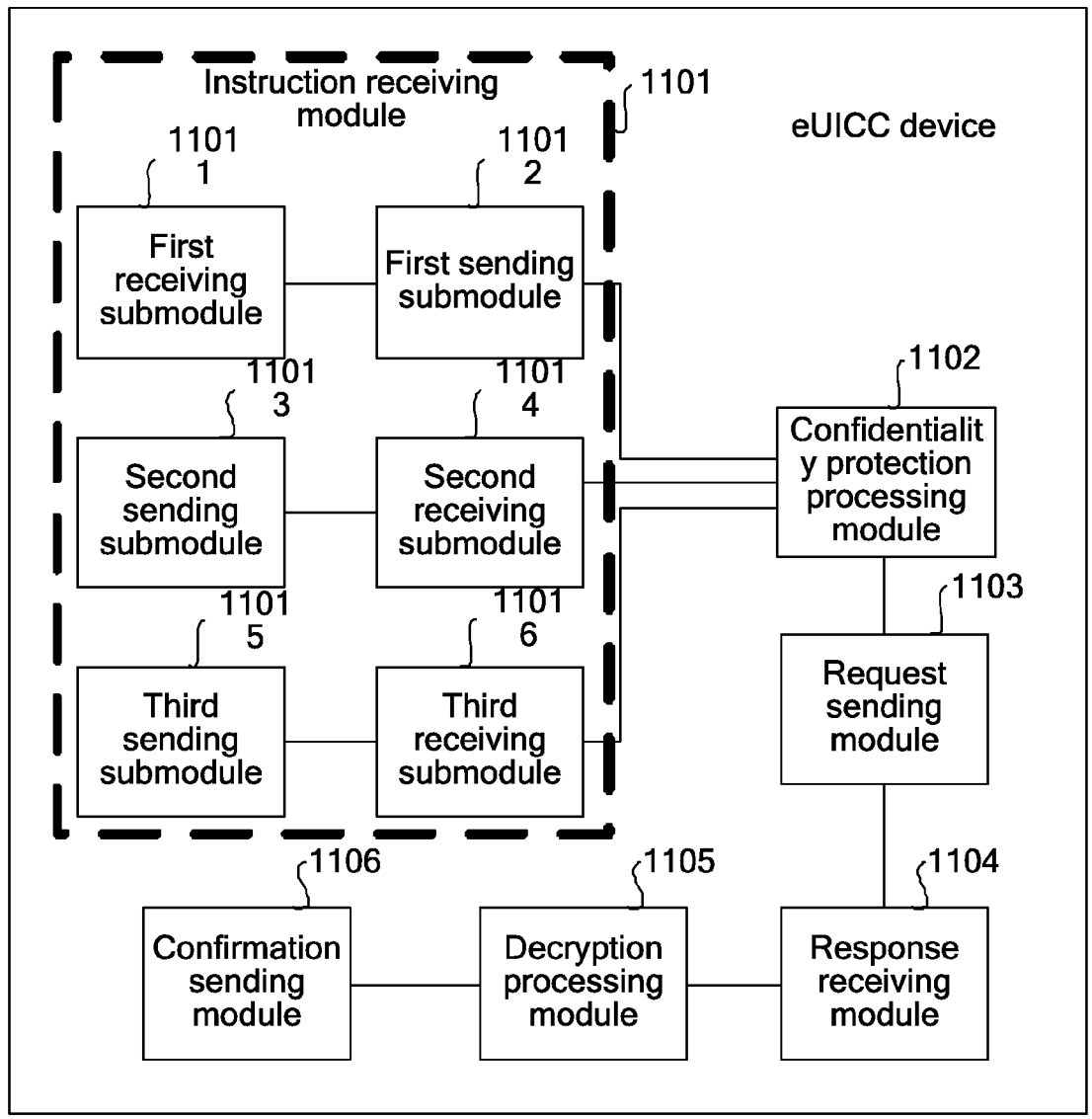
FIG. 12 is a schematic structural diagram of an eUICC device according to another embodiment of the present invention.

In an optional implementation manner, the instruction message received by the instruction receiving module 1101 is a subscription stop command. Based on this, as shown in FIG. 12, an implementation structure of the instruction receiving module 1101 includes: a first receiving submodule 11011 and a first sending submodule 11012.

The first receiving submodule 11011 is configured to receive a subscription stop command sent by the terminal device, where the subscription stop command is generated by the terminal device and sent by the terminal device to the eUICC device in this embodiment after the terminal device receives a first paging message sent by an MNO device, the first paging message is sent by the MNO device to the terminal device after the MNO device determines, according to geographical location information reported by the terminal device, that the terminal device is stolen, the first paging message includes identity information of the terminal device and a theft indication that is used for identifying that the terminal device is stolen, and the subscription stop command includes the identity information of the terminal device and the theft indication.

The first sending submodule 11012 is connected to the first receiving submodule 11011 and is configured to: after the first receiving submodule 11011 receives the subscription stop command, send a subscription stop response to SM-SR by using the terminal device, where the subscription stop response includes the identity information of the terminal device, identity information of the eUICC device in this embodiment, and the theft indication received by the first receiving submodule 11011. The first sending submodule 11012 is further connected to the confidentiality protection processing module 1102 and is configured to provide the theft indication for the confidentiality protection processing module 1102.

In an optional implementation manner, the instruction message received by the instruction receiving module 1101 is a first OP response message. Based on this, as shown in FIG. 12, an implementation structure of the instruction receiving module 1101 includes: a second sending submodule 11013 and a second receiving submodule 11014.

The second sending submodule 11013 is configured to: send a first OP request message to SM-SR by using the terminal device according to an instruction after the terminal device receives a second paging message, where the second paging message is sent by an MNO device to the terminal device after the MNO device determines, according to the geographical location information reported by the terminal device, that the terminal device is stolen, the second paging message includes the identity information of the terminal device, and the first OP request message includes the identity information of the terminal device and the identity information of the eUICC device in this embodiment.

The second receiving submodule 11014 is connected to the second sending submodule 11013 and is configured to: after the second sending submodule 11013 sends the first OP request message, receive, by using the terminal device, the first OP response message returned by the SM-SR, where the first OP response message is sent by the SM-SR after the SM-SR determines, according to the identity information of the terminal device and the identity information of the eUICC device in this embodiment, that the terminal device is stolen, and the first OP response message includes an theft indication used for identifying that the terminal device is stolen. The second receiving submodule 11014 is connected to the confidentiality protection processing module 1102 and is configured to provide the theft indication for the confidentiality protection processing module 1102.

Based on the foregoing two implementation structures of the instruction receiving module 1101, the confidentiality protection processing module 1102 may be specifically configured to delete the data in the eUICC device in this embodiment according to the theft indication.

In an optional implementation manner, the instruction message received by the instruction receiving module 1101 is a second OP response message. Based on this, as shown in FIG. 12, another implementation structure of the instruction receiving module 1101 includes: a third sending submodule 11015 and a third receiving submodule 11016.

The third sending submodule 11015 is configured to send a second OP request message to SM-SR by using the terminal device according to an instruction after the terminal device receives an attachment rejection response message, where the attachment rejection response message is sent by the MNO device to the terminal device after the MNO device receives an attachment request message sent by the terminal device and determines that the terminal device is lost, and the second OP request message includes the identity information of the terminal device and the identity information of the eUICC device in this embodiment.

The third receiving submodule 11016 is connected to the third sending submodule 11015 and is configured to: after the third sending submodule 11015 sends the second OP request message, receive, by using the terminal device, the second OP response message returned by the SM-SR, where the second OP response message is sent by the SM-SR after the SM-SR determines, according to the identity information of the terminal device and the identity information of the eUICC device in this embodiment, that the terminal device is lost, and the second OP response message includes a loss indication used for identifying that the terminal device is lost and an encryption key used for encrypting the data in the eUICC device in this embodiment. The third receiving submodule 11016 is further connected to the confidentiality protection processing module 1102.

Based on the case in which the terminal device is lost, the confidentiality protection processing module 1102 may be specifically configured to perform encryption processing on the data in the eUICC device in this embodiment by using the encryption key received by the third receiving submodule 11016 and according to the loss indication received by the third receiving submodule 11016.

Based on the foregoing, as shown in FIG. 12, the eUICC device in this embodiment further includes: a request sending module 1103, a response receiving module 1104, a decryption processing module 1105, and a confirmation sending module 1106.

The request sending module 1103 is configured to send a third OP request message to the SM-SR by using the terminal device, where the third OP request message includes the identity information of the terminal device and the identity information of the eUICC device in this embodiment. Optionally, the request sending module 1103 is connected to the confidentiality protection processing module 1102.

The response receiving module 1104 is connected to the request sending module 1103 and is configured to: after the request sending module 1103 sends the third OP request message, receive, by using the terminal device, the third OP response message sent by the SM-SR, where the third OP response message is sent after the third OP request message is received after the SM-SR determines, according to a received subscription restoration response message sent by the MNO device to the M2M-SP device, that the terminal device is held by the authorized user again, the subscription restoration response message is sent by the MNO device to the M2M-SP device after the MNO device receives the subscription restoration request message sent by the M2M-SP device, and the third OP response message includes the decryption key and a restoration indication that is used for identifying that the terminal device is held by the authorized user.

The decryption processing module 1105 is connected to the response receiving module 1104 and is configured to perform decryption processing on the data in the eUICC device in this embodiment by using the decryption key received by the response receiving module 1104 and according to the restoration indication received by the response receiving module 1104.

The confirmation sending module 1106 is connected to the decryption processing module 1105 and is configured to: after the decryption processing module 1105 performs decryption processing on the data in the eUICC device in this embodiment, send a data restoration confirmation message to the SM-SR by using the terminal device.

The functional modules in the eUICC device in this embodiment may be configured to execute corresponding procedures in the method for data confidentiality protection shown in FIG. 3, the specific working principle thereof is no longer elaborated, and for details, refer to the description of the method embodiment.

After a terminal device is not held by an authorized user, the eUICC device provided in this embodiment performs, in coordination with a network side device (such as an MNO device, SM-SR, and/or an M2M-SP device), confidentiality protection processing on data in the eUICC according to received instruction information, so as to implement protection on the data in the eUICC in a case in which the terminal device is stolen or lost, thereby better protecting security of personal information of a user.

Figure 13:
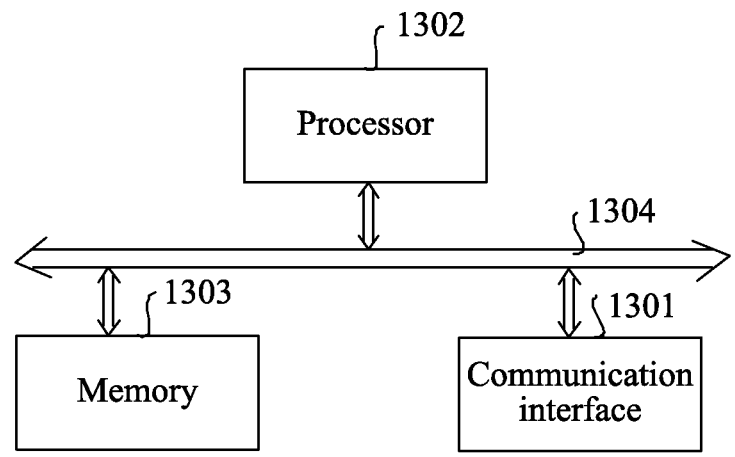
FIG. 13 is a schematic structural diagram of an eUICC device according to yet another embodiment of the present invention.

FIG. 13 is a schematic structural diagram of an eUICC device according to yet another embodiment of the present invention. The eUICC device in this embodiment is embedded in a terminal device. As shown in FIG. 13, the eUICC device in this embodiment includes: a communication interface 1301, a processor 1302, a memory 1303, and a bus 1304. The communication interface 1301, the processor 1302, and the memory 1303 are connected to each other and communicate with each other by using the bus 1304. The bus 1304 may be an ISA bus, a PCI bus, an EISA bus, or the like. The bus 1304 may be classified into an address bus, a data bus, a control bus, and the like. For ease of representation, the bus 1304 is only represented by a thick line in FIG. 13; however, it does not represent that there is only one bus or one type of bus 1304.

The memory 1303 is configured to store a program. Specifically, the program may include program code, and the program code includes a computer operation instruction. In addition to the program, the memory 1303 may further store data received or sent by the communication interface 1301.

The memory 1303 may include a high-speed RAM memory, or may further include a non-volatile memory (non-volatile memory), such as at least one magnetic disk memory.

The communication interface 1301 is configured to receive an instruction message, where the instruction message is used for instructing, when the terminal device is not held by an authorized user, the eUICC device embedded in the terminal device to perform confidentiality protection processing on data in the eUICC device.

The processor 1302 is configured to execute the program stored in the memory 1303, so as to implement the following: performing confidentiality protection processing on the data in the eUICC in this embodiment according to the instruction message received by the communication interface 1301.

The processor 1302 may be a CPU, or a specific ASIC, or one or more integrated circuits configured to implement the embodiment of the present invention.

The eUICC device provided in this embodiment may be configured to execute a corresponding procedure in the method for data confidentiality protection in FIG. 3, the specific working principle thereof is no longer elaborated, and for details, refer to the description of method embodiments.

After a terminal device is not held by an authorized user, the eUICC device provided in this embodiment performs, in coordination with a network side device (such as an MNO device, SM-SR, and/or an M2M-SP device), confidentiality protection processing on data in the eUICC according to received instruction information, so as to implement protection on the data in the eUICC in a case in which the terminal device is stolen or lost, thereby better protecting security of personal information of a user.

Figure 14:
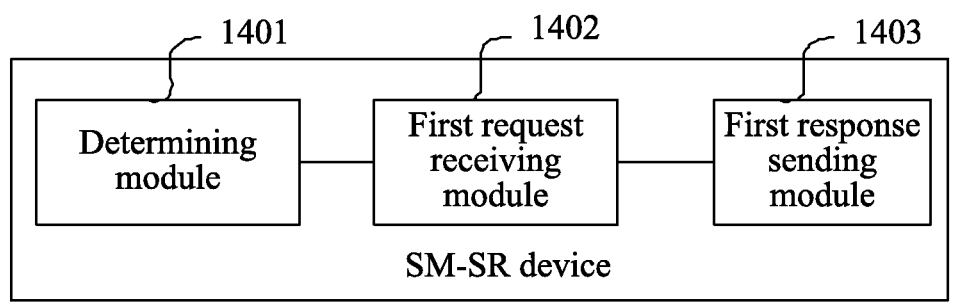
FIG. 14 is a schematic structural diagram of an SM-SR device according to an embodiment of the present invention.

FIG. 14 is a schematic structural diagram of an SM-SR device according to an embodiment of the present invention. As shown in FIG. 14, the SM-SR device in this embodiment includes: a determining module 1401, a first request receiving module 1402, and a first response sending module 1403.

The determining module 1401 is configured to determine that a terminal device is not held by an authorized user.

The first request receiving module 1402 is connected to the determining module 1401 and is configured to: after the determining module 1401 determines that the terminal device is stolen, receive a first OP request message sent by using the terminal device by an eUICC in the terminal device, where the first OP request message is sent by the eUICC as instructed by the terminal device after the terminal device receives an attachment rejection response message sent by an MNO device, and the first OP request message includes identity information of the terminal device and identity information of the eUICC.

The first response sending module 1403 is connected to the first request receiving module 1402 and is configured to: after the first request receiving module 1402 receives the first OP request message, return a first OP response message to the eUICC by using the terminal device, so that the eUICC performs confidentiality protection processing on the data in the eUICC.

Figure 15:
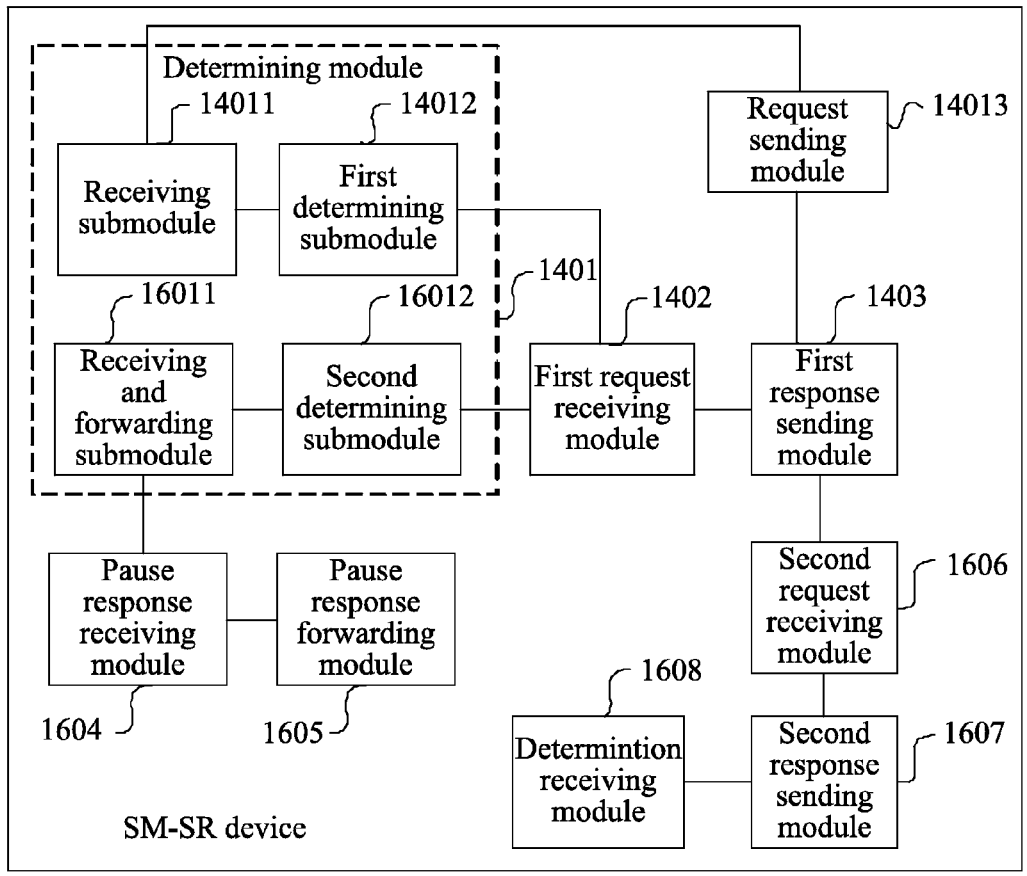
FIG. 15 is a schematic structural diagram of an SM-SR device according to another embodiment of the present invention.

In an optional implementation manner, as shown in FIG. 15, an implementation structure of the determining module 1401 includes: a receiving submodule 14011 and a first determining submodule 14012.

The receiving submodule 14011 is configured to receive a subscription stop request message sent by the MNO device, where the subscription stop request message is sent by the MNO device after the MNO device determines that the terminal device is stolen and the terminal device is in a detached state, and the subscription stop request message includes the identity information of the eUICC and a theft indication.

The first determining submodule 14012 is connected to the receiving submodule 14011 and is configured to determine, according to the identity information of the eUICC and the theft indication that are received by the receiving submodule 14011, that the terminal device is stolen. The first request receiving module 1402 is connected to the first determining submodule 14012.

As shown in FIG. 15, in a case in which the first determining submodule 14012 determines that the terminal device is stolen, the SM-SR device in this embodiment may further include: a request sending module 14013, connected to the receiving submodule 14011 and the first response sending module 1403, and configured to: after the first response sending module 1403 returns the first OP response message to the eUICC or after the receiving submodule 14011 receives the subscription stop request message, send a subscription data deletion request message to the SM-DP, so as to instruct the SM-DP to delete subscription data corresponding to the eUICC.

In the case in which the first determining submodule 14012 determines that the terminal device is stolen, the first OP response message includes the theft indication used for identifying that the terminal device is stolen, and the first response sending module 1403 may be specifically configured to return the first OP response message to the eUICC by using the terminal device, so that the eUICC deletes the data in the eUICC. Optionally, the first response sending module 1403 also may be specifically configured to return the first OP response message to the eUICC by using the terminal device, so that the eUICC performs encryption processing on the data in the eUICC. In an optional implementation manner, as shown in FIG. 15, the determining module 1401 includes: a receiving and forwarding submodule 16011 and a second determining submodule 16012.

The receiving and forwarding submodule 16011 is configured to receive a subscription pause request message sent by the M2M-SP device, and forward the subscription pause request message to the MNO device, so that the MNO device determines that the terminal device is lost, where the subscription pause request message includes the identity information of the terminal device, the identity information of the eUICC, and a loss indication.

The second determining submodule 16012 is connected to the receiving and forwarding submodule 16011 and is configured to determine, according to the loss indication received by the receiving and forwarding submodule 16011, that the terminal device is lost. The second determining submodule 16012 is connected to the first request receiving module 1402.

In a case in which the second determining submodule 16012 determines except that the terminal device is lost, the first OP response message includes the loss indication used for identifying that the terminal device is lost and an encryption key used for encrypting the data in the eUICC, and the first response sending module 1403 may be specifically configured to return the first OP response message to the eUICC by using the terminal device, so that the eUICC performs encryption processing on the data in the eUICC.

In the case in which the second determining submodule 16012 determines that the terminal device is lost, in an optional implementation manner, as shown in FIG. 15, the SM-SR in this embodiment further includes: a pause response receiving module 1604 and a pause response forwarding module 1605.

The pause response receiving module 1604 is connected to the receiving and forwarding submodule 16011 and is configured to: after the receiving and forwarding submodule 16011 forwards the subscription pause request message, receive a subscription pause response message sent by the MNO device, where the subscription pause response message includes the identity information of the terminal device and the identity information of the eUICC.

The pause response forwarding module 1605 is connected to the pause response receiving module 1604 and is configured to: forward the subscription pause response message received by the pause response receiving module 1604 to the M2M-SP device.

In the case in which the second determining submodule 16012 determines that the terminal device is lost, in an optional implementation manner, as shown in FIG. 15, the SM-SR in this embodiment further includes: a second request receiving module 1606, a second response sending module 1607, and a determination receiving module 1608.

The second request receiving module 1606 is configured to receive a second OP request message sent by using the terminal device by the eUICC, where the second OP request message includes the identity information of the terminal device and the identity information of the eUICC. Optionally, the second request receiving module 1606 is connected to the first response sending module 1403 and is configured to, after the first response sending module 1403 returns the first OP response message to the eUICC so that after performing encryption processing on the data in the eUICC, receive the second OP request message sent by using the terminal device by the eUICC.

The second response sending module 1607 is connected to the second request receiving module 1606 and is configured to: after the second request receiving module 1606 receives the second OP request message, send, by using the terminal device, a second OP response message to the eUICC, where the second OP response message is sent after the second OP request message is received after it is determined according to a received subscription restoration response message sent by the MNO device to the M2M-SP device that terminal device is held by the authorized user again, the subscription restoration response message is sent by the MNO device to the M2M-SP device after the MNO device receives the subscription restoration request message sent by the M2M-SP device, the second OP response message includes a decryption key and a restoration indication that is used for identifying that the terminal device is held by the authorized user again, so that the eUICC performs decryption processing on the data in the eUICC by using the decryption key according to the restoration indication.

The confirmation receiving module 1608 is connected to the second response sending module 1607 and is configured to: after the second response sending module 1607 sends the second OP response message, receive a data restoration confirmation message sent by using the terminal device by the eUICC.

The functional modules or submodules in the SM-SR device in this embodiment may be configured to execute corresponding procedures in the method for data confidentiality protection shown in FIG. 4, the specific working principle thereof is no longer elaborated, and for details, refer to the description of the method embodiment.

In a case in which a terminal device is not held by an authorized user, for example, the terminal device is stolen or lost, the SM-SR device in this embodiment returns an OP response for an OP request sent by an eUICC and adds an indication used for identifying that the terminal device is stolen or lost to the OP response, so that the eUICC may perform confidentiality protection processing on data in the eUICC according to the indication, so as to implement protection on the data in the eUICC in a case in which the terminal device is stolen or lost, thereby better protecting security of personal information of a user.

Figure 16:
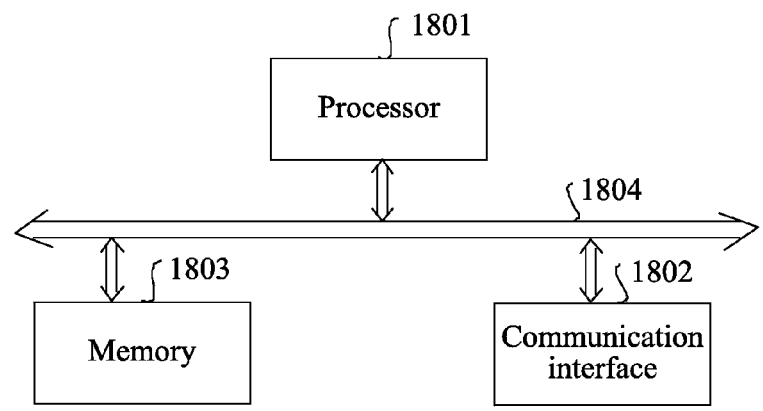
FIG. 16 is a schematic structural diagram of an SM-SR device according to yet another embodiment of the present invention.

FIG. 16 is a schematic structural diagram of an SM-SR device according to yet another embodiment of the present invention. As shown in FIG. 16, the SM-SR device in this embodiment includes: a processor 1801, a communication interface 1802, a memory 1803, and a bus 1804. The processor 1801, the communication interface 1802, and the memory 1803 are connected to each other and communicate with each other by using the bus 1804. The bus 1804 may be an ISA bus, a PCI bus, an EISA bus, or the like. The bus 1804 may be classified into an address bus, a data bus, a control bus, and the like. For ease of representation, the bus 1804 is only represented by a thick line in FIG. 16; however, it does not represent that there is only one bus or one type of bus 1804.

The memory 1803 is configured to store a program. Specifically, the program may include program code, and the program code includes a computer operation instruction. In addition to the program, the memory 1803 may further store data received or sent by the communication interface 1802.

The memory 1803 may include a high-speed RAM memory, or may further include a non-volatile memory (non-volatile memory in English), such as at least one magnetic disk memory.

The processor 1801 is configured to execute the program stored in the memory 1803, so as to determine that a terminal device is not held by an authorized user. The processor 1801 may be a CPU, or a specific ASIC, or one or more integrated circuits configured to implement the embodiment of the present invention.

The communication interface 1802 is configured to: after the processor 1801 determines that the terminal device is not held by the authorized user, receive a first OP request message sent by using the terminal device by an eUICC in the terminal device, where the first OP request message is sent by the eUICC as instructed by the terminal device after the terminal device receives an attachment rejection response message sent by an MNO device, and the first OP request message includes identity information of the terminal device and identity information of the eUICC; and the communication interface 1802 is further configured to return a first OP response message to the eUICC by using the terminal device, so that the eUICC performs confidentiality protection processing on the data in the eUICC.

Optionally, in a case in which the processor 1801 determines that the terminal device is stolen, the first OP response message includes a theft indication used for identifying that the terminal device is stolen.

Optionally, in a case in which the processor 1801 determines that the terminal device is lost, the first OP response message includes a loss indication used for identifying that the terminal device is lost and an encryption key used for encrypting the data in the eUICC.

The functional modules or submodules in the SM-SR device in this embodiment may be configured to execute corresponding procedures in the method for data confidentiality protection shown in FIG. 4, the specific working principle thereof is no longer elaborated, and for details, refer to the description of the method embodiments.

In a case in which a terminal device is stolen or lost and is therefore not held by an authorized user, the SM-SR device in this embodiment returns an OP response for an OP request sent by an eUICC and adds an indication used for identifying that the terminal device is stolen or lost to the OP response, so that the eUICC may perform confidentiality protection processing on data in the eUICC according to the indication, so as to implement protection on the data in the eUICC in cases in which the terminal device is stolen or lost or the like, thereby better protecting security of personal information of a user.

The system for data confidentiality protection based on an eUICC provided in the embodiment of the present invention includes: the MNO device provided in the embodiment shown in FIG. 8 or FIG. 9 or FIG. 10, the eUICC device provided in the embodiment shown in FIG. 11 or FIG. 12 or FIG. 13, and the SM-SR device provided in the embodiment shown in FIG. 14 or FIG. 15 or FIG. 16.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A method for data confidentiality protection, the method comprising:
   receiving an instruction message at an embedded universal integrated circuit card (eUICC) in a terminal device, wherein the instruction message is used to instruct the eUICC to perform confidentiality protection processing on data in the eUICC when the terminal device is not held by an authorized user, and wherein the instruction message comprises a subscription stop command; and
   performing, by the eUICC, the confidentiality protection processing on the data in the eUICC according to the instruction message;
   wherein receiving the instruction message comprises:
   receiving the subscription stop command sent by the terminal device, wherein the subscription stop command is generated by the terminal device and sent by the terminal device to the eUICC after the terminal device receives a first paging message sent by a mobile network operator (MNO) device, wherein the first paging message is sent by the MNO device to the terminal device after the MNO device determines that the terminal device is stolen according to geographical location information reported by the terminal device, wherein the first paging message comprises identity information of the terminal device and a theft indication that is used for identifying that the terminal device is stolen, and wherein the subscription stop command comprises the identity information of the terminal device and the theft indication; and
   sending, by the eUICC, a subscription stop response to subscription management unit-securely routing (SM-SR) by using the terminal device, wherein the subscription stop response comprises the identity information of the terminal device, identity information of the eUICC, and the theft indication.

2. The method according to claim 1, wherein performing the confidentiality protection processing on the data in the eUICC comprises deleting, by the eUICC, the data in the eUICC according to the theft indication.

3. The method according to claim 1, wherein the instruction message comprises a first operational profile OP response message; and
   wherein receiving the instruction message comprises sending a first OP request message to subscription management unit-securely routing (SM-SR) by using the terminal device according to an instruction after the terminal device receives a second paging message, wherein the second paging message is sent by a mobile network operator (MNO) device to the terminal device after the MNO device determines, according to geographical location information reported by the terminal device, that the terminal device is stolen, wherein the second paging message comprises identity information of the terminal device, and wherein the first OP request message comprises the identity information of the terminal device and identity information of the eUICC; and
   receiving, by the eUICC by using the terminal device, a first OP response message returned by the SM-SR, wherein the first OP response message is sent by the SM-SR after the SM-SR determines that the terminal device is stolen, and wherein the first OP response message comprises a theft indication used for identifying that the terminal device is stolen.

4. The method according to claim 1, wherein the instruction message comprises a second operational profile OP response message and wherein receiving the instruction message comprises:
   sending, by the eUICC, a second OP request message to subscription management unit-securely routing (SM-SR) by using the terminal device according to an instruction after the terminal device receives an attachment rejection response message, wherein the attachment rejection response message is sent by a mobile network operator (MNO) device to the terminal device after the MNO device receives an attachment request message sent by the terminal device and determines that the terminal device is lost, and wherein the second OP request message comprises identity information of the terminal device and identity information of the eUICC; and receiving, by the eUICC by using the terminal device, a second OP response message returned by the SM-SR, wherein the second OP response message is sent by the SM-SR after the SM-SR determines, according to the identity information of the terminal device and the identity information of the eUICC, that the terminal device is lost, and wherein the second OP response message comprises a loss indication used for identifying that the terminal device is lost and an encryption key used for encrypting the data in the eUICC.

5. The method according to claim 4, wherein performing the confidentiality protection processing on the data in the eUICC comprises performing, by the eUICC, encryption processing on the data in the eUICC by using the encryption key according to the loss indication.

6. The method according to claim 5, further comprising:
sending, by the eUICC, a third OP request message to the SM-SR by using the terminal device, wherein the third OP request message comprises the identity information of the terminal device and the identity information of the eUICC;
receiving, by the eUICC by using the terminal device, a third OP response message sent by the SM-SR, wherein the third OP response message is sent after the third OP request message is received and after the SM-SR determines, according to a received subscription restoration response message sent by the MNO device to a machine to machine communication service provider M2M-SP device, that the terminal device is held by the authorized user again, wherein the subscription restoration response message is sent by the MNO device to the M2M-SP device after the MNO device receives a subscription restoration request message sent by the M2M-SP device, and wherein the third OP response message comprises a decryption key and a restoration indication that is used for identifying that the terminal device is held by the authorized user;
performing, by the eUICC, decryption processing on the data in the eUICC by using the decryption key according to the restoration indication; and
sending, by the eUICC, a data restoration confirmation message to the SM-SR by using the terminal device.

7. A method for data confidentiality protection, the method comprising:
determining that a terminal device is not held by an authorized user;
receiving a first OP request message sent from the terminal device by an embedded universal integrated circuit card (eUICC) in the terminal device, wherein the first OP request message is sent by the eUICC as instructed by the terminal device after the terminal device receives an attachment rejection response message sent by a mobile network operator (MNO) device, and wherein the first OP request message comprises identity information of the terminal device and identity information of the eUICC; and
returning a first OP response message to the eUICC by using the terminal device, so that the eUICC performs confidentiality protection processing on data in the eUICC;
wherein determining that the terminal device is not held by an authorized user comprises:

receiving a subscription stop request message sent by the MNO device, wherein the subscription stop request message is sent by the MNO device after the MNO device determines that the terminal device is stolen and the terminal device is in a detached state, and wherein the subscription stop request message comprises the identity information of the eUICC and a theft indication; and determining that the terminal device is stolen according to the identity information of the eUICC and the theft indication.

8. The method according to claim 7, wherein the first OP response message comprises the theft indication used for identifying that the terminal device is stolen; and
wherein returning the first OP response message to the eUICC comprises returning the first OP response message to the eUICC by using the terminal device, so that the eUICC deletes the data in the eUICC.

9. The method according to claim 7, further comprising, after the subscription stop request message is received, sending a subscription data deletion request message to subscription management unit-data preparation SM-DP, so as to instruct the SM-DP to delete subscription data corresponding to the eUICC.

10. The method according to claim 7, further comprising, after the first OP response message is returned to the eUICC, sending a subscription data deletion request message to subscription management unit-data preparation SM-DP, so as to instruct the SM-DP to delete subscription data corresponding to the eUICC.

11. The method according to claim 7, wherein determining that the device is not held by an authorized user comprises:
receiving a subscription pause request message sent by a machine to machine communication service provider (M2M-SP) device;
forwarding the subscription pause request message to the MNO device, so that the MNO device determines that the terminal device is lost, wherein the subscription pause request message comprises the identity information of the terminal device, the identity information of the eUICC, and a loss indication; and
determining that the terminal device is lost according to the loss indication.

12. The method according to claim 11, wherein, after receiving the subscription pause request message sent, the method further comprises:
receiving a subscription pause response message sent by the MNO device; and
forwarding the subscription pause response message to the M2M-SP device, wherein the subscription pause response message comprises the identity information of the terminal device and the identity information of the eUICC.

13. The method according to claim 11, wherein the first OP response message comprises the loss indication used and an encryption key used for encrypting the data in the eUICC; and
wherein returning the first OP response message to the eUICC comprises returning the first OP response message to the eUICC by using the terminal device, so that the eUICC performs encryption processing on the data in the eUICC.

14. The method according to claim 13, further comprising:
receiving a second OP request message sent from the terminal device by the eUICC, wherein the second OP request message comprises the identity information of the terminal device and the identity information of the eUICC; and sending a second OP response message to the eUICC by using the terminal device, wherein the second OP response message is sent after the second OP request message is received after it is determined that the terminal device is held by the authorized user again according to a received subscription restoration response message sent by the MNO device to the M2M-SP device, wherein the subscription restoration response message is sent by the MNO device to the M2M-SP device after the MNO device receives a subscription restoration request message sent by the M2M-SP device, and wherein the second OP response message comprises a decryption key and a restoration indication that is used for identifying that the terminal device is held by the authorized user again, so that the eUICC performs decryption processing on the data in the eUICC by using the decryption key according to the restoration indication; and receiving a data restoration confirmation message sent by using the terminal device by the eUICC.

* * * * *